US008380721B2

(12) United States Patent
Attaran Rezaei et al.

(10) Patent No.: US 8,380,721 B2
(45) Date of Patent: Feb. 19, 2013

(54) SYSTEM AND METHOD FOR CONTEXT-BASED KNOWLEDGE SEARCH, TAGGING, COLLABORATION, MANAGEMENT, AND ADVERTISEMENT

(75) Inventors: Behnam Attaran Rezaei, Los Angeles, CA (US); Alice Hwei-Yuan Meng Muntz, Pacific Palisades, CA (US)

(73) Assignee: Netseer, Inc., Santa Clara, CA (US)

( * ) Notice: Subject to any disclaimer, the term of this patent is extended or adjusted under 35 U.S.C. 154(b) by 629 days.

(21) Appl. No.: 11/624,674

(22) Filed: Jan. 18, 2007

(65) Prior Publication Data

US 2007/0198506 A1 Aug. 23, 2007

Related U.S. Application Data

(60) Provisional application No. 60/760,244, filed on Jan. 18, 2006.

(51) Int. Cl.
*G06F 17/00* (2006.01)
(52) U.S. Cl. ......... 707/748; 707/715; 707/723; 707/737
(58) Field of Classification Search ........................ None
See application file for complete search history.

(56) References Cited

U.S. PATENT DOCUMENTS

| | | | |
|---|---|---|---|
| 5,581,764 A | 12/1996 | Fitzgerald et al. |
| 5,956,708 A | 9/1999 | Dyko et al. |
| 6,038,560 A | 3/2000 | Wical |
| 6,098,064 A | 8/2000 | Pirolli et al. |
| 6,233,575 B1 | 5/2001 | Agrawal et al. |
| 6,242,273 B1 | 6/2001 | Goodwin et al. |
| 6,397,682 B2 | 6/2002 | Kumar et al. |
| 6,446,061 B1 | 9/2002 | Doerre et al. |
| 6,544,357 B1 | 4/2003 | Hehmann et al. |
| 6,549,896 B1 | 4/2003 | Candan et al. |
| 6,665,837 B1 | 12/2003 | Dean et al. |
| 6,886,129 B1 | 4/2005 | Raghavan et al. |
| 7,031,308 B2 | 4/2006 | Garcia-Luna-Aceves et al. |
| 7,051,023 B2 | 5/2006 | Kapur et al. |
| 7,269,253 B1 | 9/2007 | Wu et al. |
| 7,483,711 B2 | 1/2009 | Burchfiel |
| 7,590,589 B2 | 9/2009 | Hoffberg |
| 7,613,851 B2 | 11/2009 | Rice et al. |
| 7,689,493 B1 | 3/2010 | Sullivan et al. |
| 7,805,536 B1 | 9/2010 | Kompella et al. |
| 7,822,745 B2 | 10/2010 | Fayyad et al. |
| 7,831,586 B2 | 11/2010 | Reitter et al. |
| 7,996,753 B1 | 8/2011 | Chan et al. |

(Continued)

OTHER PUBLICATIONS

Nima Sarshar, Scalable Percolation Search in Power Law Networks, Jun. 7, 2004, arXiv.org , pp. 1-13.*

(Continued)

*Primary Examiner* — Pierre Vital
(74) *Attorney, Agent, or Firm* — Nixon Peabody LLP

(57) ABSTRACT

Comprehensive methods and systems are described for creating, managing, searching, personalizing, and monetizing a knowledge system defined over a corpus of digital content. Systems and methods are described in which a user can initiate in-depth searches of subject matter and can browse, navigate, pinpoint, and select relevant contexts, concepts, and documents to gain knowledge. Systems and methods are described in which knowledge can be personalized through tagged, personalized context, and personalized context can be shared within social and professional networks, securely and confidentially and with the desired access control. Systems and methods are described in which products and services can be advertised in context and advertising can be selected through a bidding process. Systems and methods are described by which a user can navigate contexts and concepts to obtain relevant information, products and services.

20 Claims, 18 Drawing Sheets

U.S. PATENT DOCUMENTS

| | | |
|---|---|---|
| 2001/0049688 A1 | 12/2001 | Fratkina et al. |
| 2002/0016782 A1 | 2/2002 | Cooper |
| 2002/0049792 A1 | 4/2002 | Wilcox et al. |
| 2002/0080180 A1 | 6/2002 | Mander et al. |
| 2002/0087884 A1 | 7/2002 | Shacham et al. |
| 2003/0115191 A1 | 6/2003 | Copperman et al. |
| 2003/0187881 A1 | 10/2003 | Murata et al. |
| 2003/0217139 A1 | 11/2003 | Burbeck et al. |
| 2003/0217140 A1 | 11/2003 | Burbeck et al. |
| 2003/0220866 A1 | 11/2003 | Pisaria-Henderson et al. |
| 2003/0227479 A1 | 12/2003 | Mizrahi et al. |
| 2004/0024739 A1 | 2/2004 | Copperman et al. |
| 2004/0064438 A1 | 4/2004 | Kostoff |
| 2004/0093328 A1* | 5/2004 | Damle ................ 707/3 |
| 2005/0010556 A1 | 1/2005 | Phelan |
| 2005/0021461 A1* | 1/2005 | Flake et al. ............ 705/40 |
| 2005/0021531 A1 | 1/2005 | Wen et al. |
| 2005/0055321 A1 | 3/2005 | Fratkina et al. |
| 2005/0064618 A1 | 3/2005 | Brown et al. |
| 2005/0086260 A1 | 4/2005 | Canright et al. |
| 2005/0097204 A1 | 5/2005 | Horowitz et al. |
| 2005/0113691 A1 | 5/2005 | Liebschner |
| 2005/0114198 A1* | 5/2005 | Koningstein et al. ........ 705/10 |
| 2005/0117593 A1 | 6/2005 | Shand |
| 2005/0138070 A1 | 6/2005 | Huberman et al. |
| 2005/0144065 A1* | 6/2005 | Calabria et al. ............ 705/14 |
| 2005/0144162 A1 | 6/2005 | Liang |
| 2005/0160107 A1 | 7/2005 | Liang |
| 2005/0203838 A1 | 9/2005 | Zhang et al. |
| 2005/0210027 A1 | 9/2005 | Aggarwal et al. |
| 2005/0222900 A1 | 10/2005 | Fuloria et al. |
| 2005/0256905 A1 | 11/2005 | Gruhl et al. |
| 2005/0256949 A1 | 11/2005 | Gruhl et al. |
| 2006/0047649 A1 | 3/2006 | Liang |
| 2006/0080422 A1 | 4/2006 | Huberman et al. |
| 2006/0085408 A1* | 4/2006 | Morsa ................ 707/3 |
| 2006/0106793 A1 | 5/2006 | Liang |
| 2006/0112105 A1 | 5/2006 | Adamic et al. |
| 2006/0168065 A1 | 7/2006 | Martin |
| 2006/0171331 A1 | 8/2006 | Previdi et al. |
| 2006/0209727 A1 | 9/2006 | Jennings, III et al. |
| 2006/0212350 A1* | 9/2006 | Ellis et al. .............. 705/14 |
| 2006/0218035 A1 | 9/2006 | Park et al. |
| 2006/0235841 A1 | 10/2006 | Betz et al. |
| 2006/0242017 A1* | 10/2006 | Libes et al. ............. 705/14 |
| 2006/0271564 A1 | 11/2006 | Meng Muntz et al. |
| 2006/0294155 A1 | 12/2006 | Patterson |
| 2007/0025364 A1 | 2/2007 | Kodialam et al. |
| 2007/0033103 A1* | 2/2007 | Collins et al. ............ 705/14 |
| 2007/0061300 A1* | 3/2007 | Ramer et al. ............ 707/3 |
| 2007/0174255 A1 | 7/2007 | Sravanapudi et al. |
| 2007/0203903 A1 | 8/2007 | Attaran Rezaei et al. |
| 2007/0239534 A1 | 10/2007 | Liu et al. |
| 2007/0245035 A1 | 10/2007 | Attaran Rezaei et al. |
| 2007/0300152 A1 | 12/2007 | Baugher |
| 2008/0033932 A1 | 2/2008 | DeLong et al. |
| 2008/0065483 A1 | 3/2008 | Ball |
| 2008/0086592 A1 | 4/2008 | Stephani |
| 2008/0104061 A1 | 5/2008 | Rezaei |
| 2008/0232809 A1 | 9/2008 | Beshai et al. |
| 2008/0256061 A1 | 10/2008 | Chang et al. |
| 2008/0301033 A1 | 12/2008 | Singh et al. |
| 2009/0043648 A1 | 2/2009 | Mahdian et al. |
| 2009/0046678 A1 | 2/2009 | Lee et al. |
| 2009/0086663 A1 | 4/2009 | Ho et al. |
| 2009/0157855 A1 | 6/2009 | Adam et al. |
| 2009/0168768 A1 | 7/2009 | Chiabaut et al. |
| 2009/0265475 A1 | 10/2009 | Fujita |
| 2009/0281900 A1 | 11/2009 | Rezaei et al. |
| 2009/0296719 A1 | 12/2009 | Maier et al. |
| 2009/0300009 A1 | 12/2009 | Rezaei et al. |
| 2010/0114879 A1 | 5/2010 | Zhong et al. |
| 2011/0113032 A1 | 5/2011 | Boscolo et al. |

OTHER PUBLICATIONS

International Search Report for PCT Application No. PCT/US07/01335 dated Jan. 18, 2007.

Bagrow, J. P. et al., "A Local Method for Detecting Communities," Physical Review E, vol. 72, No. 4, 2005, 046108, pp. 1-16.

Bollobas, B., "Random Graphs," Second Edition, Cambridge University Press, United Kingdom, 2001, Chapter 1 and 2, pp. 1-59.

Boscolo, R., et al., "Functionality Encoded in Topology? Discovering Macroscopic Regulatory Modules from Large-Scale Protein-DNA Interaction Networks," Reprint arXiv:q-bio/0501039, Jan. 2005.

Chao, I. et al., "Tag Mechanisms Evaluated for Coordination in Open Multi-Agent Systems," ESAW 2007, LNAI 4995, Springer-Verlag Berlin Heidelberg, 2008, pp. 254-269.

Chung, F. et. al., "The Small World Phenomenon in Hybrid Power Law Graphs," Lect. Notes Phys., vol. 650, 2004, pp. 89-104.

Clauset, A. et al., "Finding Community Structure in Very Large Networks," Physical Review, vol. 70, No. 6, Dec. 2004, 066111.

Erdos, P. et al., "On the Evolution of Random Graphs," Publication of the Mathematical Institute of the Hungarian Academy of Sciences, vol. 5, 1960, pp. 343-347.

Erdos, P. et al., "On the Strength of Connectedness of a Random Graph," Acta Mathematica Scientia Hungarica, vol. 12, Nos. 1-2, 1961, pp. 261-267.

Flake, G. W. et al., "Self-Organization and Identification of Web Communities," IEEE Computer Society, vol. 35, Issue 3, Mar. 2002, pp. 66-71.

Franceschetti M. et. al., "Navigation in Small World Networks, a Scale-Free Continuum Model," Jul. 2003, pp. 1-9.

Franceschetti et. al., "Closing the Gap in the Capacity of Wireless Networks Via Percolation Theory," Oct. 26, 2004, IEEE, pp. 1-10.

Garton, L., et al., "Studying On-Line Social Networks," Doing Internet Research, Edited by S. Jones, Thousand Oaks, Calif., 1999, pp. 75-105.

Girvan, M. et al., "Community Structure in Social and Biological Networks," PNAS, vol. 99, No. 12, Jun. 2002, pp. 7821-7826.

Golbeck, "Accuracy of Metrics for Inferring Trust and Reputation in Semantic Web-based Social Networks," Apr. 2004, pp. 1-11.

Gonzalez-Barahona, J. M. et al., "Community Structure of Modules in the Apache Project," MSR '05: Proceedings of the 2005 International Workshop on Mining Software Repositories, 2005.

Kernighan, B. W. et al., "An Efficient Heuristic Procedure for Partitioning Graphs," The Bell System Technical Journal 49, Feb. 1970, pp. 291-307.

Kini et. al., "Fast and Efficient Randomized Flooding on Lattice Sensor Networks," Nov. 19, 2004, Drexler University, pp. 1-33.

Lyons, R. et al., "Probability on Trees and Networks," Apr. 17, 2005, pp. 1-53.

Manku, G. S. et. al., "Know thy Neighbor: the Power of Lookahead in Randomized P2P Networks," STOC'04, Jun. 2004, pp. 1-10.

Newman, M. E. J., "Coauthorship Networks and Patterns of Scientific Collaboration," PNAS, vol. 101, Apr. 2004, pp. 5200-5205.

Newman, M. E. J., "Fast Algorithm for Detecting Community Structure in Networks," Physical Review E 69, Jun. 2004, pp. 066133.1-066133.5.

Newman, M.E.J. et al. "Finding and Evaluating Community Structure in Networks," Physical Review E, vol. 69, 026113, 2004, pp. 1-16.

Owczarek, A. L. et. al., "Generalised Percolation Probabilities for the Self-Dual Potts Model," J. Phys. A: Math. Gen. 20, Apr. 1987, pp. 5263-5271.

Page, L. et al., "The PageRank Citation Ranking: Bringing Order to the Web," Technical Report, Stanford InfoLab, 1999.

Patch, K., "Simple Search Lightens Net load," TRN, Sep. 2004, pp. 1-3.

Pons, P. et al., "Computing Communities in Large Networks Using Random Walks," ArXiv Condensed Matter e-prints, Dec. 2004.

Pothen, A. et al., "Partitioning Sparse Matrices with Eigenvectors of Graphs," Society of Industrial and Applied Mathematics, SIAM Journal on Matrix Analysis and Applications, vol. 11, No. 3, Jul. 1990, pp. 430-452.

Radicchi, F. et al., "Defining and Identifying Communities in Networks," PNAS, vol. 101, No. 9, Mar. 2004, pp. 2658-2663.

Rives, A. W. et al., "Modular Organization of Cellular Networks," PNAS, vol. 100, No. 3, Feb. 2003, pp. 1128-1133.

Sarshar, N. et al., "Scalable Percolation Search in Power Law Networks," Jun. 2004, Department of Electrical Engineering, University of California, Los Angeles, pp. 1-13.

Scott, J. "Social Network Analysis: A Handbook," 2nd Edition, Sage Publications, London, 2000, Chapter 4, pp. 63-81.

Wasserman, S., "Social Network Analysis: Methods and Applications," Cambridge University Press, Cambridge, England, 1994, pp. 17-20 and Chapter 7, pp. 249-290.

Weikum, G. et al., "Towards Self-Organizing Query Routing and Processing for Peer-to-Peer Web Search", DELIS-TR-0287, 2005, 19 pages.

Wellman, B. et al., "Computer Networks as Social Networks: Collaborative Work, Telework, and Virtual Community," Annual Reviews Sociology, vol. 22, No. 1, 1996, pp. 213-238.

Wu, F. et al., "Finding Communities in Linear Time: a Physics Approach," The European Physical Journal B, vol. 38, No. 2, 2004, pp. 331-338.

Zachary, W. W. "An Information Flow Model for Conflict and Fission in Small Groups," Journal of Anthropological Research, vol. 33, No. 4, Winter, 1977, pp. 452-473.

U.S. Appl. No. 13/098,870, filed May 2, 2011.

Chinese First Office Action in Chinese Patent Application No. 200680025190.6, dated Sep. 11, 2009.

Chinese Second Office Action in Chinese Patent Application No. 200680025190.6, dated Jun. 3, 2010.

International Search Report and Written Opinion for PCT Application No. PCT/US2006/14160, mailed Sep. 4, 2007.

International Search Report and Written Opinion for PCT Application No. PCT/US2007/001335, mailed Feb. 12, 2008.

International Search Report and Written Opinion for PCT Application No. PCT/US2007/001694, mailed Feb. 14, 2008.

International Search Report and Written Opinion for PCT Application No. PCT/US2007/005504, mailed Jul. 29, 2008.

Office Action in U.S. Appl. No. 11/125,329, mailed Mar. 30, 2010.
Office Action in U.S. Appl. No. 11/125,329, mailed Jun. 24, 2009.
Notice of Allowance in U.S. Appl. No. 11/125,329, mailed Feb. 2, 2011.
Notice of Allowance in U.S. Appl. No. 13/098,870, mailed Jun. 28, 2012.
Office Action in U.S. Appl. No. 11/625,279, mailed Mar. 18, 2009.
Office Action in U.S. Appl. No. 11/625,279, mailed Dec. 8, 2009.
Office Action in U.S. Appl. No. 11/625,279, mailed May 13, 2010.
Office Action in U.S. Appl. No. 11/625,279, mailed Oct. 25, 2010.
Office Action in U.S. Appl. No. 11/625,279, mailed Sep. 16, 2011.
Office Action in U.S. Appl. No. 11/625,279, mailed Apr. 17, 2012.
Office Action in U.S. Appl. No. 11/680,599, mailed Apr. 29, 2009.
Office Action in U.S. Appl. No. 11/680,599, mailed May 21, 2010.
Office Action in U.S. Appl. No. 11/680,599, mailed Jan. 5, 2011.
Office Action in U.S. Appl. No. 11/680,599, mailed Aug. 29, 2011.
Office Action in U.S. Appl. No. 11/680,599, mailed Apr. 30, 2012.
Office Action in U.S. Appl. No. 11/923,546, mailed Feb. 26, 2010.
Office Action in U.S. Appl. No. 11/923,546, mailed Aug. 2, 2010.
Office Action in U.S. Appl. No. 11/923,546, mailed Dec. 22, 2010.
Office Action in U.S. Appl. No. 11/923,546, mailed Jun. 3, 2011.
Office Action in U.S. Appl. No. 12/130,171, mailed Apr. 1, 2011.
Office Action in U.S. Appl. No. 12/130,171, mailed Oct. 19, 2011.
Office Action in U.S. Appl. No. 12/130,171, mailed Aug. 15, 2012.
Office Action in U.S. Appl. No. 12/436,748, mailed Sep. 16, 2011.
Office Action in U.S. Appl. No. 12/436,748, mailed May 2, 2012.
Office Action in U.S. Appl. No. 12/476,205, mailed Oct. 12, 2011.
Office Action in U.S. Appl. No. 12/476,205, mailed Jul. 3, 2012.
Office Action in U.S. Appl. No. 12/610,202, mailed May 22, 2012.
Office Action in U.S. Appl. No. 12/906,051, mailed Mar. 13, 2012.

* cited by examiner

| virus (1704) | | Search (1705) |

(1707)

Computer Virus, Spam, Computer Trojan, Spyware, Anti-virus, Hack, Security update, Firewall (1706)

Vmyths.com- Truth About Computer Virus Myths & Hoaxes
The canonical reference for computer virus myths, hoaxes, and urban legends.
www.vmyths.com/ - 25k —

Howstuffworks "How Computer Viruses Work"
Computer viruses range from pesky to outright dangerous. Clicking on what looks like a harmless e-mail message can lead to hours of recovery efforts, ...
computer.howstuffworks.com/virus.htm - 37k -

Symantec Security Response
Virus Definitions created January 13 Virus Definitions released January 13 ...
Total Viruses Detected: 71994. Learn More. Norton AntiVirus for Mac Defs ...
securityresponse.symantec.com/ - 25k - Cached - Similar pages Symantec Security Response - Search and Latest Virus Threats Page
The list below provides a synopsis of the latest virus-related threats discovered by
... A [Computer Associates], December 28, 2005, December 28, 2005 ...
securityresponse.symantec.com/avcenter/vinfodb.html - 45k -

CERT/CC Computer Virus Resources
If you are not familiar with computer viruses or do not know how to ...
The international publication on computer virus prevention, recognition and removal
www.cert.org/other_sources/viruses.html - 31k -

(1708)

Sponsored Links

Spyware Virus Remover
PC Magazine Editor's Choice
Winner Best Anti-Spyware.
Download Now!
www.pcpekuatools.com Free Virus Scan
If your computer is slowing
down or crashing, free scan.
Kills worms!
www.Stop-Pekua.com Computer Virus Removal
Get rid of Adware and
Spyware fast! Free download
cleans the mess
NoPekuaAdware.net Computer Virus Experts
Help for removing computer
viruses.
eeks-By-Minute to your rescue.
www.geekspekua.com

| More in this context | Expand this context |
| (1700) | (1709) |

(1703)

Health, Flu Virus, West Nile, Symptoms, Influenza Virus, Research, HIV

West Nile Virus Health Data in New Mexico
West Nile Virus has emerged in recent years in temperate regions of Europe and North
www.health.state.nm.us/wnv.html - 15k -

Influenza Virus (Flu): Online Reference For Health Concerns
Influenza Virus (Flu) - symptoms, diagnosis and treatment information.
www.lef.org/protocols/prtcl-051.shtml - 77k - Cached - Similar pages West Nile Virus Information
West Nile Virus information from the Maryland Department of Health and Mental
Hygiene.
edcp.org/html/west_nile.html - 19k - Cached - Similar pages Viruses and bacteria
Viruses are too small to be seen by the naked eye. They can't multiply on their own, so they have to
UK's leading independent health website ...
www2.netdoctor.co.uk/health_advice/facts/virusbacteria.htm - 41k —

West Nile Virus - west nile virus symptoms, west nile disease ...
Virus Health Center ... Latest Health News on West Nile Virus. • Full Coverage - West Nile Virus
health.yahoo.com/centers/west_nile_virus/index - 36k -

(1702)

(1701)

Sponsored Links

Unexplained Symptoms?
Why guess? Our business is that
of telling you what's really going
on.
www.Pekua-Example.com symptoms
diagnosis
diseases MyPekuaAdExample.com

| More in this context | Expand this context |
| (1705) | (1710) |

Figure 17

| Sun | | Search |
|---|---|---|
| (1800) | | (1801) |

Sun Microsystems, Java, Solaris, Univ

Sun Microsystems Sun Microsystems, Inc. The Network Is The Computer[tm].
www.sun.com/ - 17k Download Java Software Welcome to java.com. Brought to you by Sun Microsystems.
Java Software Download | Select Language | Contact | Help. Duke's Zone · Games · Mobile · Desktop ...
java.com/getjava/index.jsp - 10k –

Sun Microsystems - Wikipedia, the free encyclopedia Sun Microsystems is headquartered on the west campus of Agnews Developmental Area in Santa Clara, California, which was formerly an asylum. ...
en.wikipedia.org/wiki/Sun_Microsystems - 57k -

[More in this context] [Expand this context]

(1802)
Sponsored Links

Quadruple Your Money
Undervalued Investment Stock Picks hot Tech Stock Tip for Tuesday.
www.PekuaStock.com Used Sun Microsystems
Apto Solutions - Sun Reseller for Systems, Parts, RTU's, X-Options
www.pekuasolutions.com

Solar System, Earth, Mars

Views of the Solar System: SunThe Sun is the most prominent feature in our solar system. It is the largest object and contains approximately 98% of the total solar system mass.
www.solarviews.com/eng/sun.htm - 22k -

Views of the Solar System Views of the Solar System presents a multimedia adventure unfolding the splendor of the Sun, planets, moons, comets and asteroids.
www.solarviews.com/eng/homepage.htm - 13k -

Our Solar System Visit links to the Sun, and visit the planets and other small bodies in the Solar System. Find out about solar system formation, and facts about the bodies ...
www.windows.ucar.edu/tour/link=/our_solar_system/solar_system.html - 14k

[More in this context] [Expand this context]

(1803)
Sponsored Links

Planets,Moon,Solar System
Education & Reference - Science Computers & Networking at eBay
www.ePekua.com Solar System Music
Available at the internet's largest digital independent music store.
www.Pekua911.com

Newspaper, News,

The Sun Newspaper Online - UK's biggest selling newspaper
The Sun is a British tabloid newspaper owned by News Corporation.
www.thesun.co.uk/ -

Vancouver Sun
Inside The Sun. News · Editorial · Letters · WestCoast News · Arts & Life BusinessBC · Travel ·
www.canada.com/vancouversun/ - 61k -

Las Vegas Sun
The Las Vegas SUN newspaper online brings you the latest local news, business,weather,
www.lasvegassun.com/ - 33k -

Herald Sun
The Herald Sun, Australia's biggest-selling daily newspaper, and the Sunday Herald Sun, the
www.heraldsun.news.com.au/ - 69k - Cached - Similar pages

[More in this context] [Expand this context]

(1804)
Sponsored Links

Vancouver Sun Online
Browse or download a complete copy of today's Vancouver Sun.
www.presspekua.com New York Times Newspaper
Los Angeles - Get Home Delivery for as little as $2.90 per week!
www.pekuatimes.com Read Newspapers Here
Read newspapers before they will appear on newsstands.
www.PressPekua.com

Figure 18

SYSTEM AND METHOD FOR CONTEXT-BASED KNOWLEDGE SEARCH, TAGGING, COLLABORATION, MANAGEMENT, AND ADVERTISEMENT

CROSS-REFERENCE TO RELATED APPLICATIONS

The present application claims benefit of priority from U.S. Provisional Patent Application Ser. No. 60/760,244, titled "Method And Apparatus For Context-Based Knowledge Search, Tagging, Collaboration, Management And Advertisement" and filed Jan. 18, 2006, the contents of which are incorporated herein by reference and for all purposes.

BACKGROUND OF THE INVENTION

1. Field of the Invention

The present invention relates generally to methods for analyzing relational systems where nodes have local interactions or links, and in particular to methods for analyzing linked databases.

2. Description of Related Art

Current search engines use indexing of terms as their foundation, and it is presumed that semantics of the documents and of the user information need can be naturally expressed through sets of index terms. This index is generated as an inverted index from terms to documents. This approach has many fundamental problems. People tend to use different wordings to describe a concept, and sometime employ a whole paragraph or document to describe a new concept. Even with improved semantic processing such as checking synonyms and variations of a word keyword, indexing usually fails to extract relevant content associated with a non-simple or non-trivial concept. Documents retrieved in response to a user request expressed as a set of keywords are frequently irrelevant because users often do not know how to properly form queries in Boolean Expression, or cannot generate a suitable set of keywords describing the knowledge or concept being sought. Thus, the issue of predicting which documents are relevant, and which are not, is a central problem of information retrieval systems.

Existing search engines generally use keyword-based categorization, indexing, matching, presenting, navigating, ranking, and managing a plurality of documents. Ranking algorithms generally establish a simple ordering of the documents retrieved in response to a query. Documents appearing at the top of this ordering are considered to be more likely to be relevant. Different global and local ranking schemes have been used to establish documents such as web pages that are relevant to the likelihood of user's needs. These methods include variations of the page rank algorithm, which establishes a global ranking based on links to and from web pages, simulates a random browsing of internet and estimates the likelihood that a user, by random navigation, will arrive at a particular page. While such methods can provide a global score of potential user viewing behavior, it does not take into account the cognitive aspect of content and knowledge associated with web pages. Kleinberg's hub and authority method (HIT) (including variations) have been used to attribute local importance to pages. However, the HIT type of approaches requires an initial query result against which the relevance of the related pages in World Wide Web or document databases can be measured. One of the primary drawbacks of this method is that it has to be carried out in real time; i.e. after a query has been submitted made and a set of results obtained, the algorithm attempts to crawl the neighborhood of these results in real-time to find hubs and important pages. Moreover these methods do not detect cases where a node has exerted "undue influence" on the computation of hub scores, and documents in a community hub, i.e., the relevant documents, are not ranked.

The most popular method of context creation is through manual grouping of relevant content that can be manifested in directories or any other manual link and content listing. However, these listings can quickly become obsolete due to the dynamic nature of the World Wide Web and the scale of data can also render manual editing of data impracticable or inefficient.

Current search engine and information retrieval systems allow users to personalize and share their keyword searches within their online social/professional networks, and also enable users to add tags and additional information on search results. Often these results are summarized as single URLs or via access to a manually generated list of relevant links. This approach has many fundamental problems, namely knowledge is mostly a collection of related documents and contents, and not single documents and contents. Moreover, the same content can appear in multiple knowledge bases with different relevancies, and a knowledge base may comprise a dynamic set of documents, i.e., a document over time may lose its importance to a knowledge context and new documents may become more relevant. Thus, static lists of documents provide an inefficient means for sharing information. People would prefer to share knowledge and not keywords or single documents.

In conventional systems, most documents publicly available through World Wide Web are accessible without security constraints on sharing. Since knowledge can be characterized as collections of documents relevant to a topic or concept, documents and contents in this collection become information. Thus, when a specific set of documents is put to use in a specific context, (i.e. knowledge in context), such knowledge may become sensitive and require the implementation of access security constraints.

Current internet search engines use keyword-based advertisement subscriptions, auctioning, and click through cost, where monetizing is centered on auctioning of keywords; advertisements for a relevant keyword are ranked and displayed according to associated bid amounts. However, the highest bid advertisements are frequently not the most relevant to a user's intended interests because keywords generally cannot properly represent the context of a user's intentions and keywords cannot represent products and services provided by an advertiser. As an example, a user entering a query including the word "virus" may be seeking information on types of organic virus (such as a flu virus) but will almost exclusively obtain advertisements from computer virus protection companies. In another example, a user looking for RFID will only get RFID hardware related advertisement, since hardware vendors are the high bidders for RFID keyword, although most users may be looking for RFID integrators and software solutions. Such keyword-based advertisements would result in lower click-through rates and lower-quality advertisements and, consequently, advertisers may pay for click-through without receiving the benefit of corresponding sells.

BRIEF SUMMARY OF THE INVENTION

Certain embodiments of the invention use automated context finding and indexing to group relevant content as a context that represents knowledge on a topic. Certain embodiments of the invention can provide improved relevance feedback by allowing tagging and personalization of contents and contexts. Certain embodiments of the invention can provide means for users to navigate knowledge landscape by keywords and from different context views.

Certain embodiments of the invention provide innovative methods of finding relevant contexts, such as groups of related content, context indexing, and reverse context indexing. Reverse mapping of contents within their context can be implemented. Content can belong to different contexts and content and context can have different indexing and scoring according to context. Certain embodiments provide context indexing in which context can be mapped with respect to its constituent content and context, concepts and associated relevancy scores within each constituent content, local context relevancy score, and global relevancy score. Reverse context indexing can be provided in which a reverse mapping of contexts between relevant documents, significant concepts, words, sub-context, super-context, and personalization.

Certain embodiments of the invention provide innovative search, navigation and personalization of relevant contexts; for example, investigation and navigation of a knowledge landscape is provided wherein knowledge can be captured through collections of documents and content in addition to capture through single documents and content sources. Thus, methods of collaboration are provide whereby users can share knowledge, as opposed to sharing keywords, knowledge in context and documents corresponding to contexts relevant to their collaboration. Certain embodiments of the invention enable users to define knowledge by finding relevant contexts and create and personalize their contexts.

Certain embodiments of the invention provide a method of defining multi-level knowledge security, interfacing, and management for both documents as information and for knowledge as a collection of information. This new knowledge management paradigm enables users to personalize and share this knowledge through their online social network. Certain embodiments can limit sharing of such information and knowledge to collaborators and can define knowledge as a collection of relevant papers and technical reports. Knowledge sharing and collaboration among members of a research group can include a collection of information such as knowledge context, owner profile, context sharing profile and an apparatus for collaborate and add their comments, tags and internal documents. In another example, data mining and security analysis for homeland security could be implemented that provides and maintains important knowledge regarding a group of related people or events, hidden links forming knowledge context to be searched and extracted. Furthermore, tracking, sharing, and collaboration related to this type of knowledge can be provided.

Certain embodiments of the invention provide context-sensitive "Ad Billboard" and "Ad Billboard-Context-Synchronization" presentation. The context-sensitive Ad Billboard can provide Ad Billboard space for each context and a mapping between context, concepts, keywords and a context advertisement space.

Certain embodiments of the invention provide comprehensive methods and systems for creating, managing, searching, personalizing, and monetizing a knowledge system defined over a corpus of digital content. In certain embodiments, systems and methods are provided for dividing a plurality of linked documents in a linked database into a hierarchy of sets of documents called contexts.

In certain embodiments of the invention, predefined concepts can be linked to documents in context using their structural and semantic closeness. Each context can be assigned a Universal Context ID ("UCI") and the context score of each document may be calculated for all relevant contexts. Furthermore, statistical concepts relevant to each context can be calculated as a set of statistically significant patterns of words in a context.

In certain embodiments of the invention, user input and other input queries can be matched to index contexts for extracting a set of relevant documents and contexts. The results may then be presented to a user based on ranking in multiples of relevant contexts' scores and a list of ranked documents for each relevant context according to the likelihood of relevance to user interests.

Certain embodiments of the invention allow users to add personal content including documents, links, news, contacts which are identified by a unique User Content ID UCI to each context. The system can further enable users to share their personalized context using their social networks including email, instant messenger, etc, and can provide an access control mechanism to restrict accessibility of the personalized contents to itself, subset of community or global access.

Certain embodiments of the invention allow users to perform contextual search using server's master context index and personalized index of relevant users in social community with proper permissions.

DETAILED DESCRIPTION OF THE INVENTION

Figure 1:
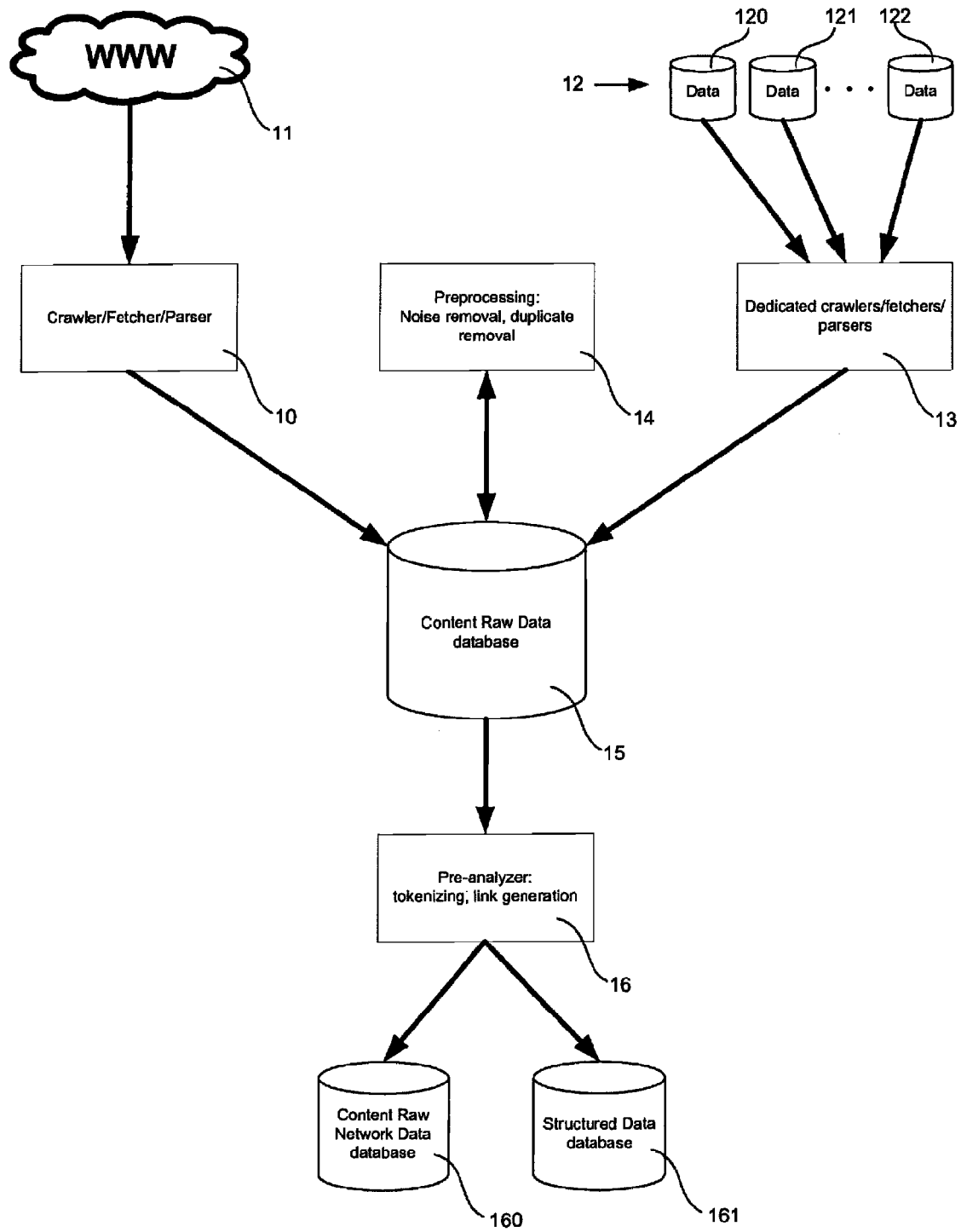
FIG. 1—Illustrates an embodiment of the architecture of the data acquisition and context creation modules FIG. 2—Illustrates an embodiment of the context creation module FIG. 3—Illustrates predefined concept extraction process FIG. 4—Illustrates a context creation process FIG. 5—Illustrates an indexing content within context process FIG. 6—Illustrates an advertisement in context architecture FIG. 7—Illustrates a manual advertisement posting process FIG. 8—Illustrates an automated advertisement posting process FIG. 9—Illustrates an in-context query match frame work FIG. 10—Illustrates an online personalization process FIG. 11—Illustrates an online personalization control panel FIG. 12—Illustrates a Sticky Anchor Process FIG. 13—Illustrates a process of sharing Context Anchor FIG. 14—Illustrates a framework for context anchor sharing FIG. 15—Illustrates an in context word and concept indexing of documents FIG. 16—Illustrates a Query Matching Architecture FIG. 17—Illustrates an example of in-context interface FIG. 18—Illustrates another example of in-context interface

Certain embodiments of the invention will now be described in detail with reference to the drawings, which are provided as illustrative examples so as to enable those skilled in the art to practice the invention. Notably, the figures and examples below are not meant to limit the scope of the invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention employ automated context finding and indexing to group relevant content as a context that represents knowledge on a topic. Systems and methods are provided for crawling, indexing, analyzing concepts and searching content in context. Furthermore, certain embodiments provide relevant interface and query capabilities to match content in context and to provide advertisements in context and to allow users to personalize the context. For the purposes of this description, context can be defined as a grouping of documents, objects, entities, concepts, categories, WebPages, database entries, emails, including digital content and information content based on structural closeness and semantic closeness. A plurality of contexts may be linked together or otherwise associated to form a hierarchy of overlapping contexts.

In certain embodiments, a context can include a unique UCI, identifying a unique instance of the context and a set of contents, each of which can be identified by a corresponding UCI, together with a corresponding semantic and structural score within the context. Moreover, a context can include an array of predefined concepts and corresponding relevance scores each score indicative of relevance of the predefined concept to the context. Typically, each of the predefined concepts can be characterized as a pattern of terms previously derived from content including, for example, a pattern of single or multiple words extracted from categorized data that can include technical terms, people, organizations, products, encyclopedia definitions, documents, patents, categories, etc. Categorized data may be obtained from any available source including, for example, the USPTO patent database, an encyclopedia, and so on. Context can also include one or more statistical concepts and indications of corresponding relevance with respect to the context, where each concept may be defined as a pattern of single or multiple words extracted automatically from a corpus of content—including plural documents—related to this context. A context can also include a contextual hierarchy comprising links between the context and its associated parent contexts and sub-contexts in which concepts may be inherited by sub-contexts from a preceding context or sub-context.

Certain embodiments of the invention provide innovative methods of finding relevant contexts, such as groups of related content, context indexing, and reverse context indexing. Reverse mapping of contents within their context can be implemented. Content can belong to different contexts and content and context can have different indexing and scoring according to context. Certain embodiments provide context indexing in which context can be mapped with respect to its constituent content and context, concepts and associated relevancy scores within each constituent content, local context relevancy score, and global relevancy score. Reverse context indexing can be provided in which a reverse mapping of contexts between relevant documents, significant concepts, words, sub-context, super-context, and personalization.

Certain embodiments of the invention provide innovative search, navigation and personalization of relevant contexts; for example, investigation and navigation of a knowledge landscape is provided wherein knowledge can be captured through collections of documents and content in addition to capture through single documents and content sources. Thus, methods of collaboration are provide whereby users can share knowledge, as opposed to sharing keywords, knowledge in context and documents corresponding to contexts relevant to their collaboration. Certain embodiments of the invention enable users to define knowledge by finding relevant contexts and create and personalize their contexts.

In certain embodiments of the invention, systems and methods are provided for dividing a plurality of linked documents in a linked database into a hierarchy of sets of documents called contexts. Grouping of linked documents can be based on automatic categorization via structural and semantic similarity analysis of the documents or manual categorization of the documents. Additionally, the sets can be overlapping. Any preferred clustering and grouping method can be used. In certain embodiments of the invention, percolation community finding methods and systems, as described in U.S. patent application Ser. No. 11/125,329, "Method and Apparatus for Distributed Community Finding," filed, May 10, 2005 and incorporated herein by reference, can be used to automatically identify overlapping contexts of documents and categorize documents into groups with structure and semantic similarity. As new documents are added to the database, the description or properties of each relevant context can be updated, or new multiples of contexts may be created, where a new context may be created from updating, merging and splitting of pre-existing multiple contexts.

A set of predefined concepts can be generated from categorized data. An example of categorized data can be list of companies and company information. Predefined concepts can include companies, people, documents, news, encyclopedia definitions, disease conditions and symptoms, treatments, etc. In certain embodiments of the invention, predefined concepts can be linked to documents in context based on structural and semantic closeness.

Each context can be assigned a UCI and the context score of each document may be calculated for all relevant contexts. Furthermore, statistical concepts relevant to each context can be calculated as a set of statistically significant patterns of words in a context. A pattern of words can be single or multiple words or a substring of word. The contexts may then be indexed on predefined concepts and statistical concepts using inverted indices. The documents can then be inverted indexed by the patterns of words, predefined concepts, and statistically significant concepts, where the patterns of words associated with a specific context with respect to a document score can be boosted by the context score of the associated context.

In certain embodiments, user input and other input queries can be matched to index contexts for extracting a set of relevant documents and contexts. The results may then be presented to a user based on ranking in multiples of relevant context scores and a list of ranked documents for each relevant context according to the likelihood of relevance to user interests. The context scores can be computed for the union and intersections of overlapping multiples of contexts, and the contexts are typically presented in descending score with respect to the computed context score. Content presented in each context may be presented in order of descending score, with respect to the concept relevancy in this context. Relevant context-sensitive advertisements can be extracted via matching of subscribed contexts and concepts with the extracted relevant documents and contexts to form the associated context-sensitive Ad Billboard. The order of placement of advertisements can be ranked according to the PPC pricing metrics or impression pricing metrics for each concept for each context or a context.

The presentation interface typically interacts with the browser to (i) detect a user's pinpoint/anchor and details of navigation of the hierarchy of contexts; (ii) show the finer resolution context that may result from narrowing down the pinpointed context, when the user pinpoints a context within the selected context; or (iii) show the expanded results when the user goes back to higher level contexts.

Each context can have a UCI and can be personalized for each user identified by a Unique User ID. The system may enable users to add tags, summary and description to contexts and provides instant access to contexts without navigation through context anchors which can be defined as a pair of UCI and UUI.

Certain embodiments of the invention allow users to add personal content including documents, links, news, contacts which are identified by a unique User Content ID UCI to each context. The system can further enable users to share their personalized context using their social networks including email, instant messenger, etc, and can provide an access control mechanism to restrict accessibility of the personalized contents to itself, subset of community or global access.

Certain embodiments of the invention allow users to perform contextual search using server's master context index and personalized index of relevant users in social community with proper permissions.

FIG. 1 includes a block diagram illustrating an example of one embodiment of the invention. In the example, data acquisition, preprocessing and parsing functions can be performed by tools that include crawlers and parsers 10 that typically fetch data from web 11. Preprocessing tools 14 can perform a variety of functions including removal of noise and aged or duplicate data. Crawlers, parsers 10, 13 and other components may be distributed across multiple platforms and in different physical locations. Crawlers and parsers 10, 13 may be provided as software components and may be written, for example, in Java. Crawlers and parsers 10, 13 and preprocessors 14 can be executed in parallel on a server running, for example, Ubuntu distribution Linux OS. It will be appreciated, however, that the scope of the invention is not limited by hardware, operating system and programming language choices used in any embodiment.

Crawlers and parsers 10, 13 typically store raw content data on one or more Content Raw Data databases 15. In certain embodiments, a set of dedicated crawlers and parsers 13 may be employed to obtain data and raw content from one or more proprietary databases or other structured data sources 12. For example, a crawler and a downloader 13 may be implemented to obtain patent data from the USPTO database. Dedicated crawlers and parsers 13 can be created, configured or customized to retrieve data from any structured web source or other database sources 120, 121, 122. Dedicated crawlers and parsers 13 may insert retrieved data into Content Raw Data database 15. In certain embodiments, a crawling scheduler may be included that schedules processing by distributed crawlers and parsers 10, 13 based on a master crawler index. Various different methods can be configured or combined to estimate and model content freshness and generate a crawl schedule. In certain embodiments, the crawling index may be generated based on information associated with contexts, user usage, feedback and probabilistic modeling of content freshness.

In certain embodiments, preprocessing function 14 is provided for removal of irrelevant content. Typically, preprocessing function 14 can identify and remove duplicate content and can include various methods and functions such as comparison of content, hash signature, unwanted domain removal, adult content removal, rule-based filtering, predefined content filtering and DNS analysis filtering.

Typically, content raw data database 15 can be accessed by pre-analyzer 16 which may perform a number of initial operations including tokenization and in-link and out-link extraction of the content. In certain embodiments, an unstructured content result such as web content can be stored in content raw network database 15 while structured and predefined content results can be stored in structured data database 161. For example, pre-analyzer 16 may extract and store a linking graph associated with a plurality of web pages. The web pages are typically stored in content raw network database 160. In one example, patent-related data including company names, people name, patent numbers and be retrieved from a USPTO database and may be stored in structured data database 161.

Figure 2:
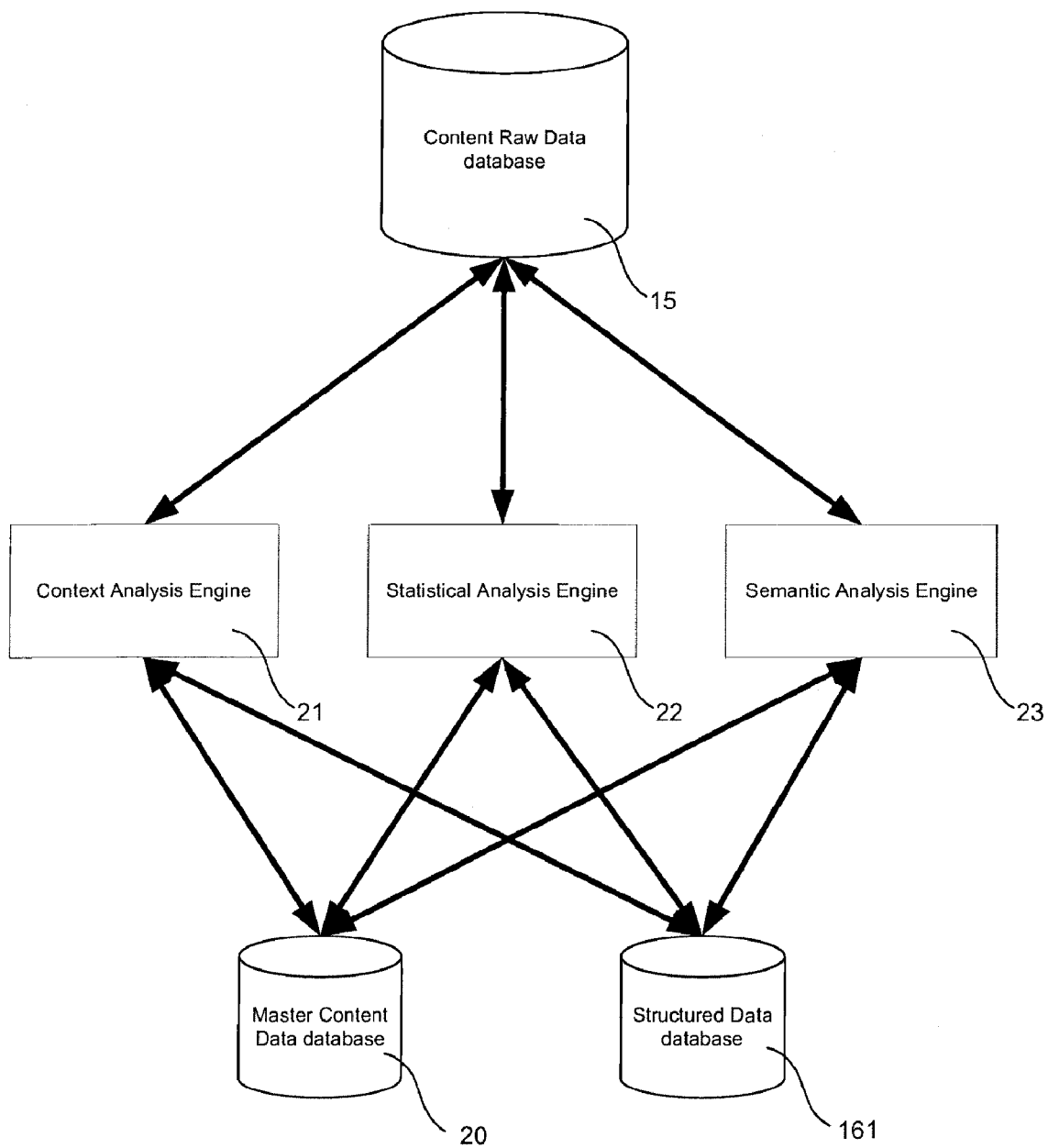

FIG. 2 further depicts certain structured data parsing and extraction functions. These data acquisition processes include a context analysis engine 21, statistical analysis engine 22 and semantic analysis engine 23. These data acquisition processes may be implemented on a common computing platform or may be distributed between servers and user devices. In certain embodiments, all data acquisition processes can be performed in parallel, in which each module processes new and updated data.

Figure 3:
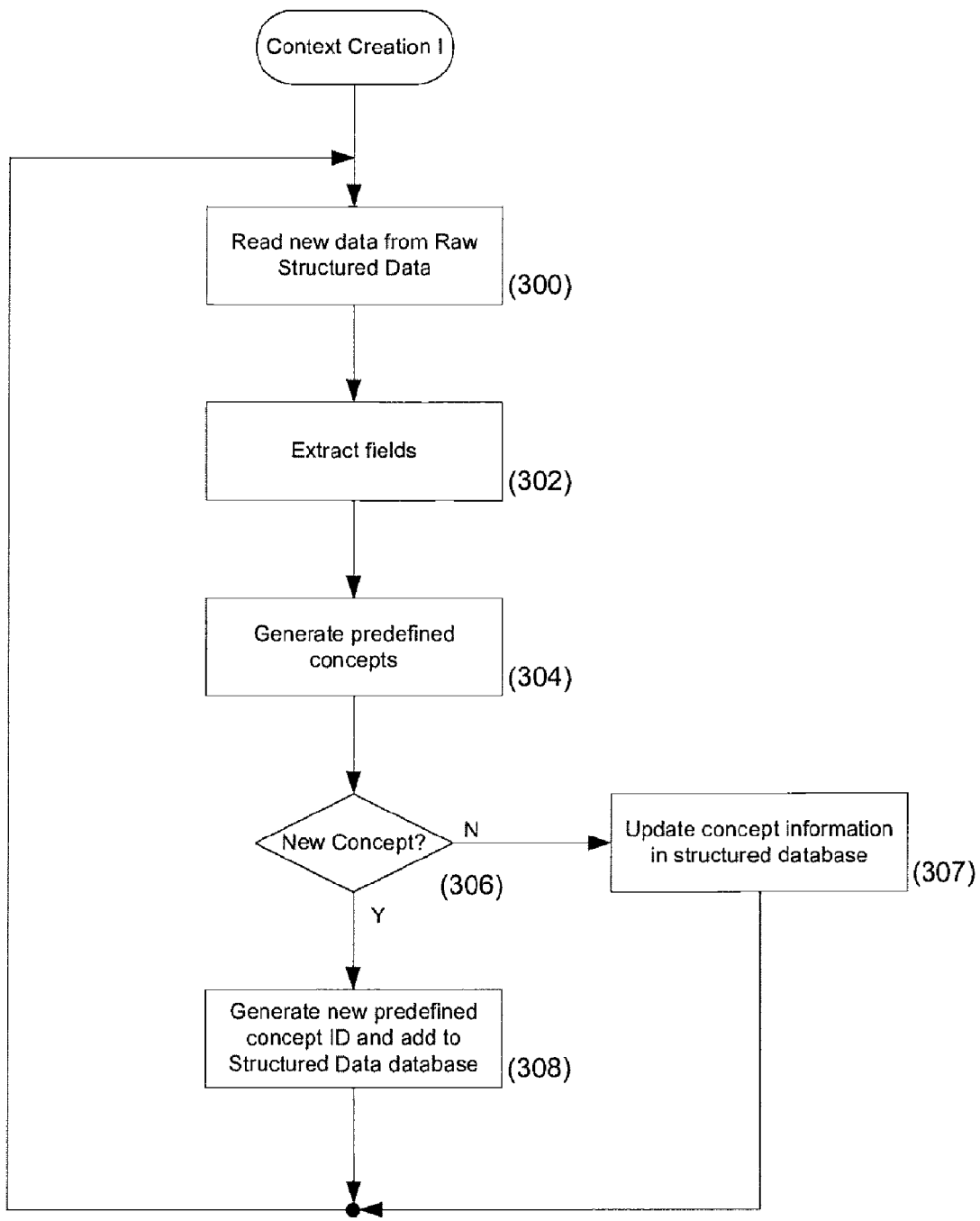

FIG. 3 illustrates a process for parsing structured data as implemented in certain embodiments. At step 300, new data is read from raw structured data database 15 and certain selected fields of the data may be extracted at step 302. Based on a predefined taxonomy of the data, predefined concepts can be extracted at step 304. Predefined concepts can include a unique predefined concept ID (PCID), a pattern of single or multiple words and may include a number of properties like type, details, date. In a simple example, a company—"Ilial Inc.", can be associated with a company name, mailing address, top management, description, stock symbol, market cap, industry, and products. When it is determined at step 306 that a new predefined concept is required, the new concept is typically assigned a new PCID. Different properties can be associated with the new predefined concept, including, for example, description, type, category, array of score of documents in contexts, etc. The new predefined concept and its properties can then be added to structured data database at step 308 to obtain updated concepts. If a pre-existing concept is encountered at step 306, then its properties in the structured database may be updated as necessary or desired at step 307 to obtain updated concepts.

Figure 4:
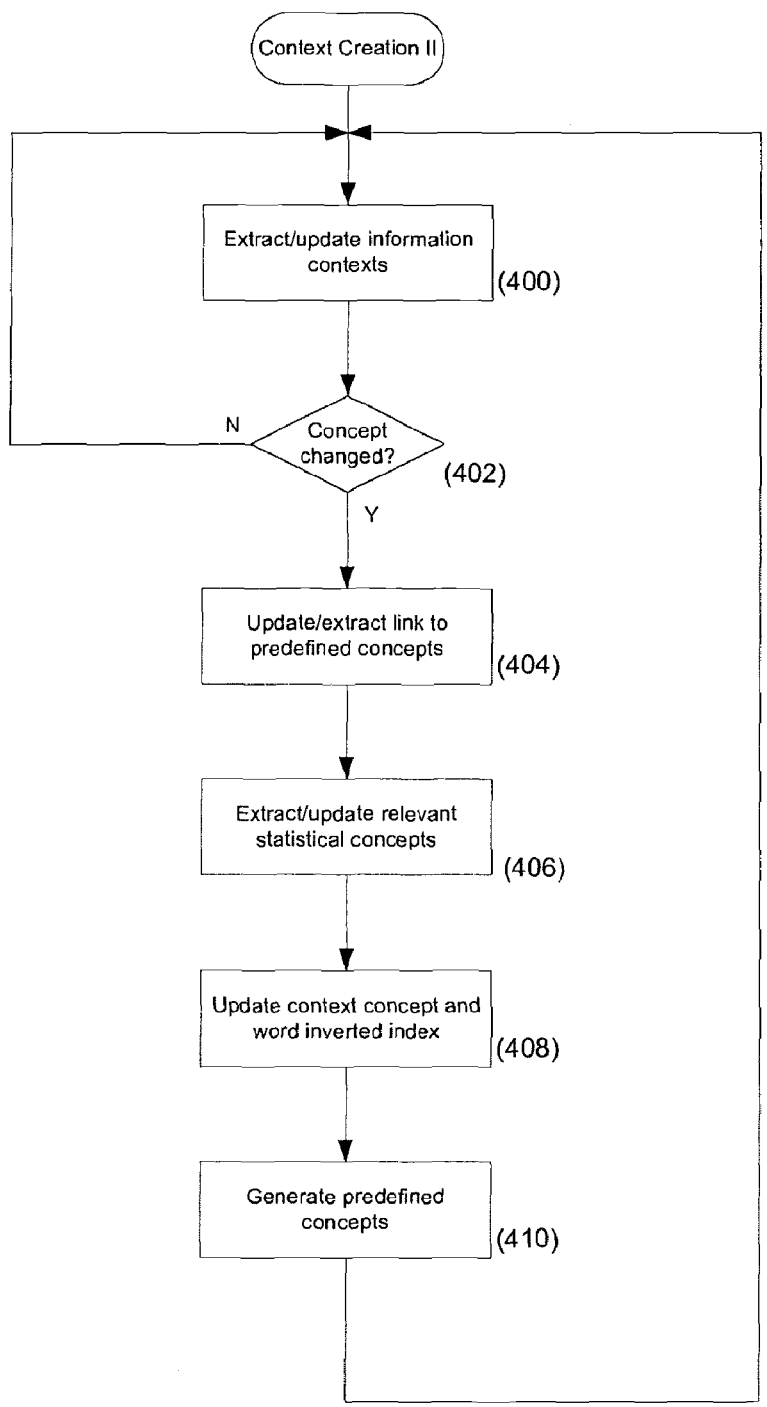

FIG. 4 illustrates a process used in processing context information. At step 400, context information for the content network database 160 can be calculated. A hierarchy of overlapping contexts may be created based on structural and semantic closeness of content. Content can belong to multiple contexts, and a sub-context can belong to multiple top contexts. In certain embodiments, contexts are calculated using information neighborhood analysis, as described in U.S. patent application Ser. No. 11/125,329, titled Method and Apparatus for Distributed Community Finding and filed on May 10, 2005. In information neighborhood analysis, contexts can be calculated iteratively using percolation based community finding methods combined with stochastic variation of agglomerative community finding (Newman 04) or any other suitable community finding method. Having calculated contexts, the contexts can be updated by checking for any changes in contexts at step 402. If any context changes are observed, then the modified contexts can be updated. Updates may include merging of two contexts, providing a new context, dividing a context into two contexts and updating the contents of a context or any other general update operation on contexts.

When a new context is created, links to relevant predefined concepts in the structured data database 161 can be updated or established at step 404. This link maintenance function may be performed in any manner as appropriate or required. In certain embodiments, potential links to predefined concepts can be initially extracted through keywords associated with the content. For example, where content includes the words "sun," "java," and "servers," first potential links could be created that include links to Sun (nearest star to planet Earth), Sun Microsystems, Chicago Sun, Java programming language, Indonesia, brewed coffee, computer servers and restaurant servers. Next, a clustering of the links may eliminate unnecessary links; in the example, only Sun Microsystems, Java Programming Language and computer server would remain in consideration.

Statistical concepts of each context can then be calculated at step 406 by looking at the statistical frequency of occurrence of words within a context. Many different statistical methods can be used to extract the significant words wherein the words can include compound complex terms, i.e. patterns of more than one word. In certain embodiments, frequency of the words in a context can be calculated after removing common words, removing word noise and subsequently dividing by frequency of occurrence of the word in entire corpus of content. The most significant words may be selected using a biasing procedure that assigns a higher weight to compound terms than to terms containing single words. The weights can be further tuned by biasing the definition of the related terms in an encyclopedia. Concepts can then be related to context hierarchy wherein sub-contexts inherit the concepts of the parent context. Any other conventional indexing and or semantic analysis tools such as GTP (Latent Semantic Analysis), SVDLibC, Lucerne, Egothor, Xapian, MG4J, Glimpse, Verity, Harvest, and htdig can be used and tailored for the purpose of performing semantic analysis.

After extracting relevant predefined and statistical concepts, an inverted index of words, predefined contexts and statistical concepts of the context can be calculated at step 408. In certain embodiments an inverted index of words and concepts to contents can be generated at step 408 and contexts with associated score may be generated. Any suitable inverted index generation method that can be used to index words and documents may typically be configured or modified to index keywords and content to contexts. In certain embodiments, index generation methods may be implemented in Java code and executed in a Linux environment such as Ubuntu Linux.

At step 410, one or more inverted indices of the documents can be updated according to corresponding indices associated with their contexts using any suitable method known in the art. In certain embodiments, an index of a context can be concatenated to an index of documents based on the score of the document in the context. For example, if concept "Ilial Inc." has a score of 2.0 in a context, then a document with score of 0.5 in that context would have an index score of 2.0×0.5=1.0 for the concept "Ilial Inc."

Figure 5:
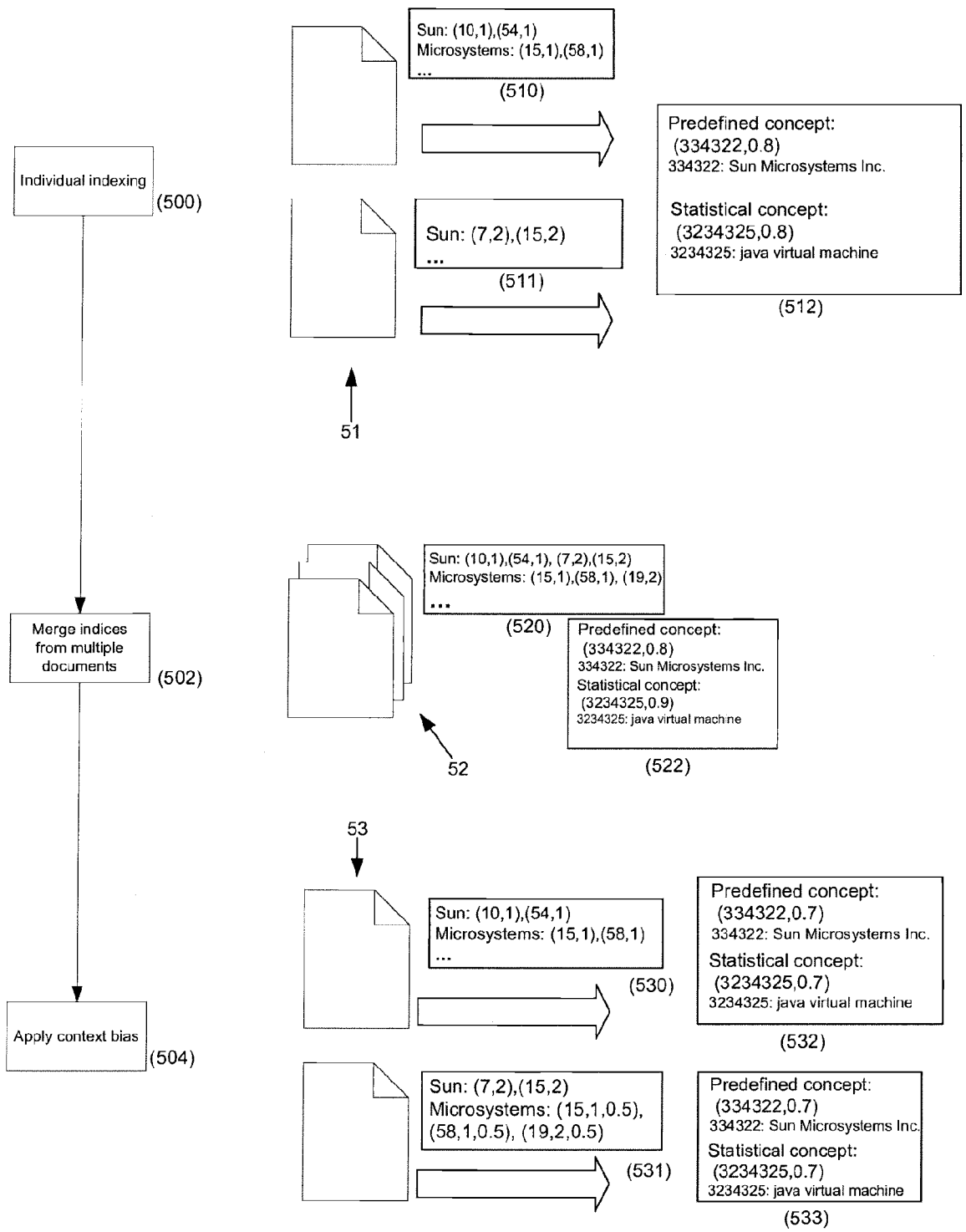

Turning now to FIG. 5, an example of an embodiment is illustrated in which a process of indexing content within context is provided. At step 500, documents in a context 51, are indexed individually as 510, 511, and concepts 510, 511 are extracted, the concepts including predefined concepts and statistical concepts 512. In the example, a first document in the context, among other documents in the context, includes the word "Microsystems," but "Microsystems" is not found in a second document. At step 502, indices of the plurality of contents 52 in a context can be merged according to their score in context and one or more context index 520,522 can be generated. Summarization and merge can be implemented using various methods. In certain embodiments of the invention, a random sampling of the keywords may be used to generate the summary index of the context. At step 504, an index of each portion of the content may be influenced by index of its contexts. Thus, the second document having a zero weight for the keyword Microsystems and zero weight for predefined and statistical concept of Sun Microsystems Inc and Java Virtual Machine respectively, can have a non-zero index due to context bias.

In certain embodiments, the context index may be calculated as a weighted sum of the index score of the documents. For example, where a first document having a score 0.7 in a context has weight 0.4 for a word or concept and a second document having a score 0.2 in the context has weight 0.6 for the word or concept, then the context will have weight $$0.4 \times 0.7 + 0.2 \times 0.6 = 0.4,$$

for the word or concept. This method can be easily generalized to any function of the plurality of the contents in a context. Moreover, in certain embodiments of the invention, context bias of the context can include adding a weight to the content proportional to its score in context for all the words in a context index.

Continuing with the latter example, a weight of the word X in the context (i.e. 0.4) is added to the first document as $0.4 \times 0.7 \times \alpha$ and to the second document as $0.4 \times 0.2 \times \alpha$, where $\alpha$ is the bias factor. Thus the weight of the word or concept X for first and second documents will be $0.4 + 0.4 \times 0.7 \times \alpha$ and $0.6 + 0.4 \times 0.2 \times \alpha$, respectively. The biasing of the contents of a context based on the context bias can be generalized to include any function of the content and context index.

Certain embodiments of the invention provide context-sensitive "Ad Billboard" and "Ad Billboard-Context-Synchronization" presentation. The context-sensitive Ad Billboard can provide Ad Billboard space for each context and a mapping between context, concepts, keywords and a context advertisement space. Context-sensitive knowledge monetization can provide advertisers with effective Ad Billboard spaces, with more accurate targeting via receiving more relevant click through or viewings with respect to users' intention advertisements; it can also stimulate higher potential customer revisits and additional customers, who are collaborators of the original researcher and content creator, since knowledge context personalization and tagging method and apparatus can provide sticky relationships between users, collaborators, and advertisers.

Figure 6:
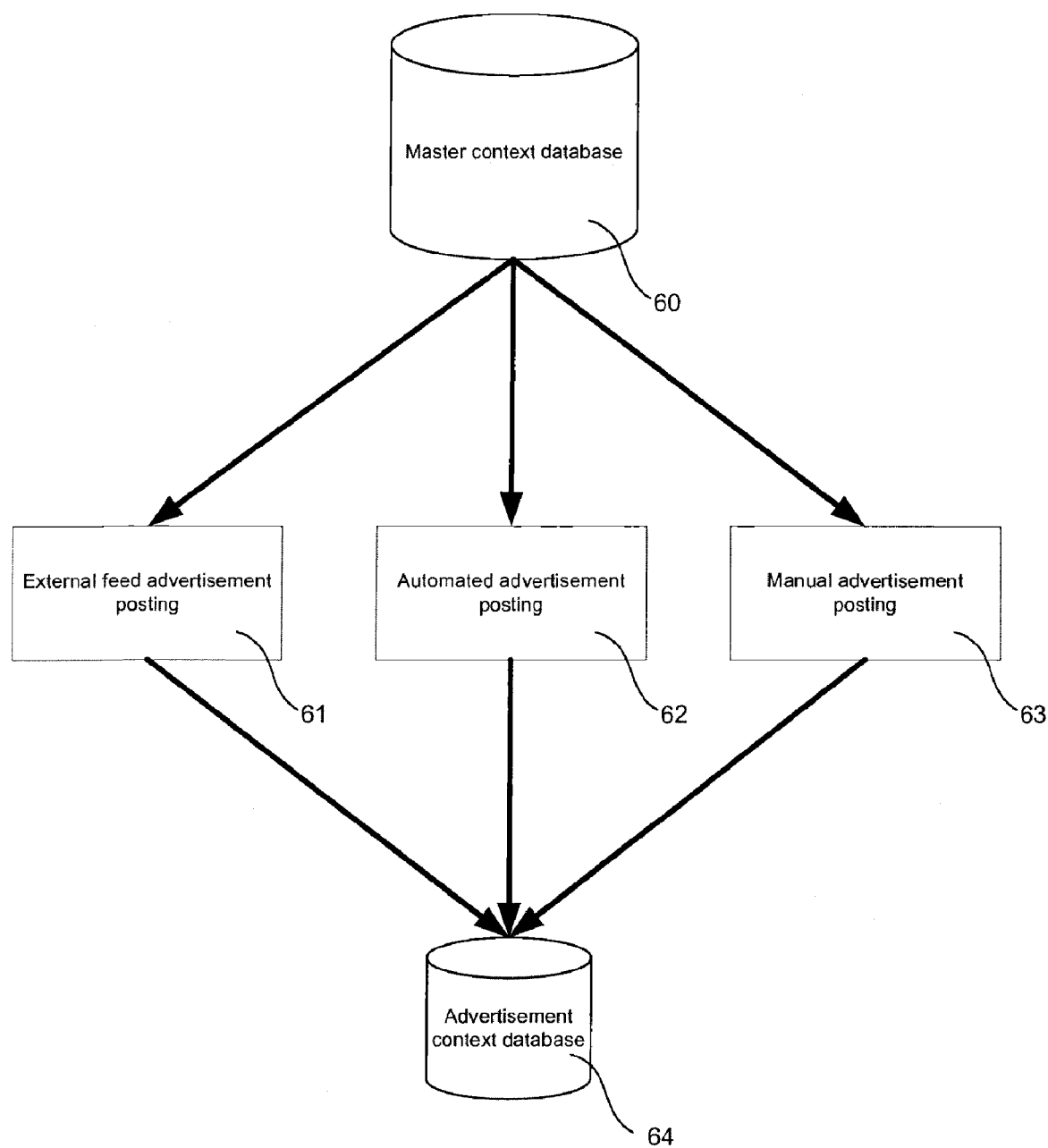

FIG. 6 illustrates an advertisement engine architecture provided in certain embodiments of the invention. An advertisement that is relevant to a context may be obtained from various sources including an external advertisement feed 61, automatic processes 62, manual entry 63 by user selection of a number of contexts and bidding for advertisement, and as a result of system function interacting with a master content database 60 that provides relevant context responsive to software query and user input.

In certain embodiments, advertisements may be input to the current invention through an internal feed (not shown), or external feed 61 provided by any suitable source including Yahoo overture, Google ad words, Ad Sense and other advertisement feed or services. Typically, the advertisement feed can be queried using the related concepts of the context to obtain relevant advertisements that can be presented in context. In one example, a context with concepts including "support groups, score=0.9," "brain tumor score=0.85," "therapy score=0.6," can use a variation of keywords such as "brain tumor support groups," "support groups," "brain tumor," "support group therapy" and "brain tumor therapy" to obtain relevant advertisement from the feed. Thus, advertisements can be extracted that are most relevant to the context associated with a user.

In certain embodiments, marketers or any user wishing to advertise can manually add advertisements by choosing and bidding on contexts of interest 63. The system may find relevant contexts associated with a user based on their input, where the input can include a description, a website and a combination of contexts. The system may also find relevant contexts associated with a webpage by finding the relevant information neighborhood of the webpage. The system may find relevant contexts associated with a description by matching the keywords and concepts to the provided text.

Figure 7:
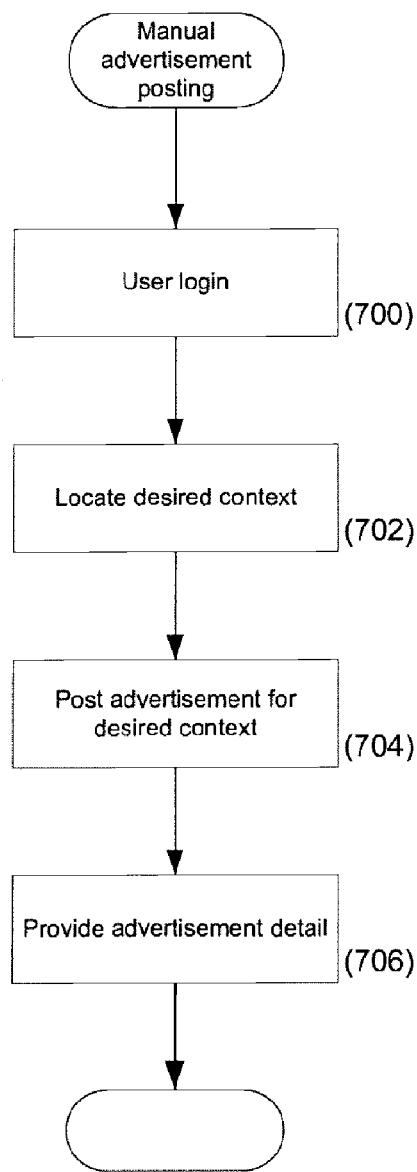

FIG. 7 provides an illustrative example of a process for manual feed 63 of advertising. In the example, at step 700, a user is authenticated by the system through a login process. The user may then navigate the system to find desired relevant contexts at step 702. This navigation can be performed through searches to arrive at a context that describes the user's products and services or that otherwise is associated with the products and services. The user can then add the contexts to list of chosen contexts at step 704. At step 706, the user may then provide details of the advertisement including title, description of the advertisement, redirection URL, bid amount, billing address and Unique User ID.

Figure 8:
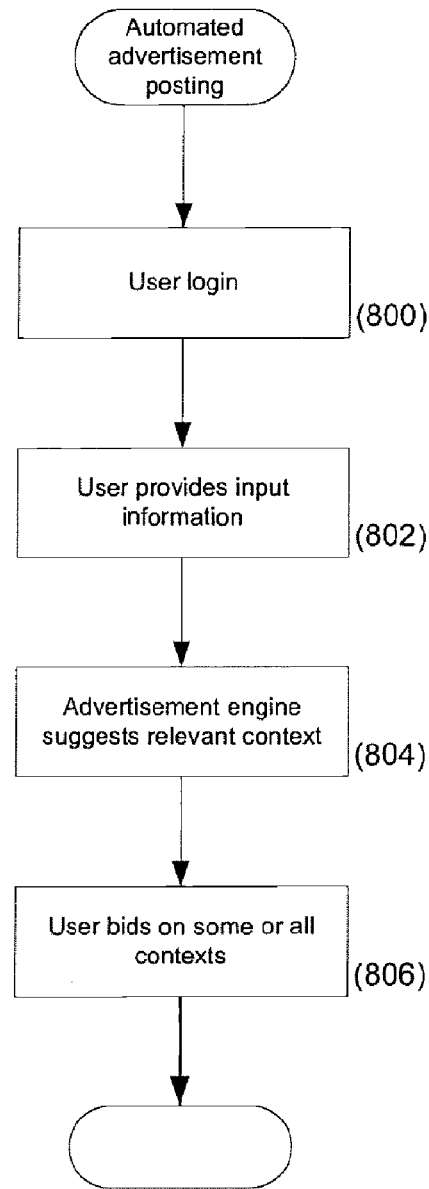

FIG. 8 illustrates a process for automated advertisement posting. In the example, the user or software may first be authenticated to access the system at step 800. User input and a software query describing information relevant to the advertisement topic may be acquired at step 802. Relevant information may include product or service descriptions, one or more URLs and predefined concepts. The system may then provide relevant contexts based on the acquired information at step 804. Various methods for matching input information may be used including methods for finding relevant contexts for URLs using a web information neighborhood and methods for identifying relevant concepts and keywords associated with the provided description.

At step 806, the user or automated software can then choose to bid on a subset or all of the identified contexts and may provide additional information including title, description, and redirection hyperlink.

Figure 9:
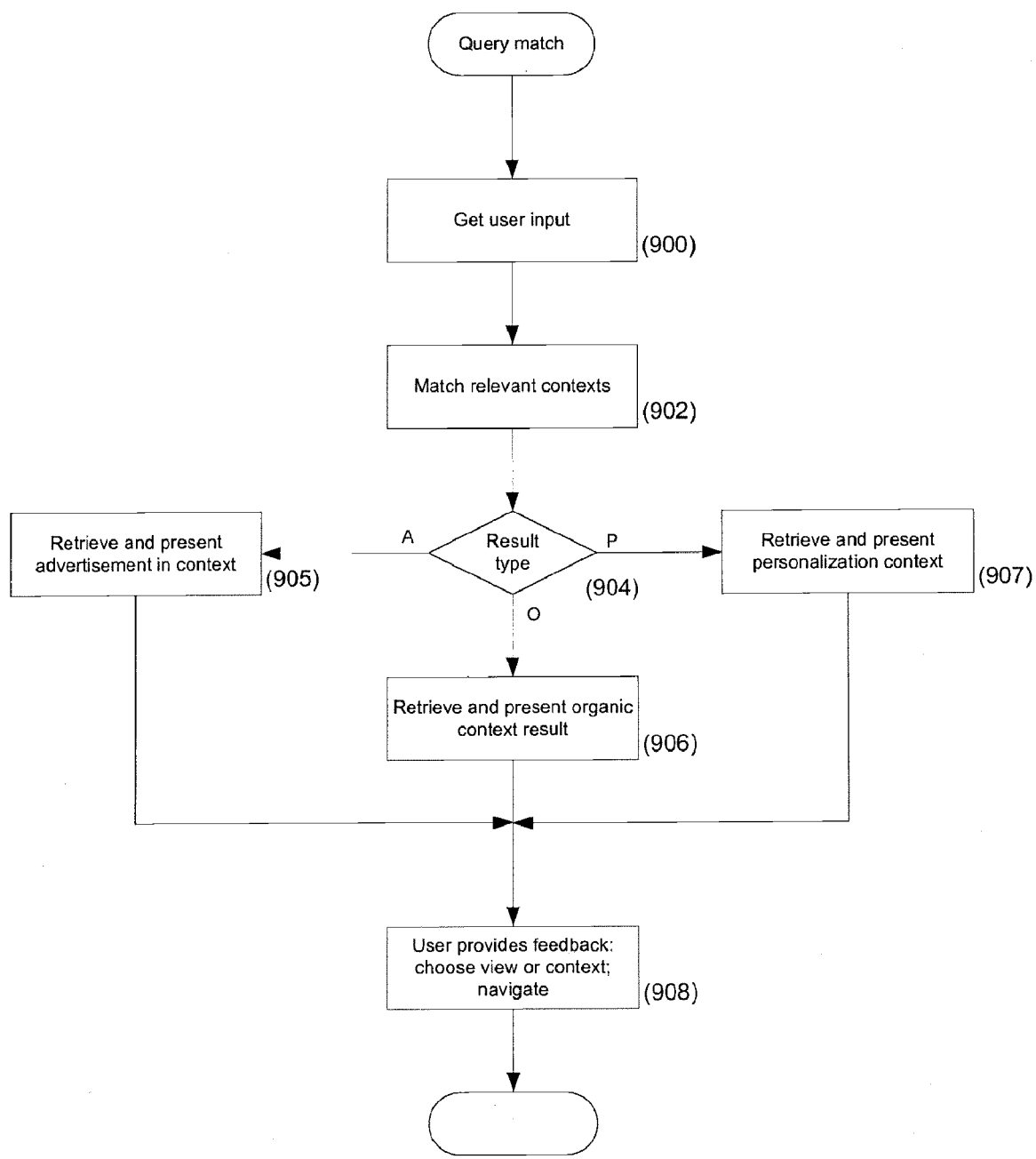

FIG. 9 illustrates a process of matching one or more contexts to software input query and user input query. A query can be reverse mapped to a set of contexts that are relevant to the query. In certain embodiments, relevant context is matched to the input query at step 902. The input can be matched through one or more context inverted index to contexts with highest relevancy score. Moreover, a content inverted index can be used to match high relevancy score contents. Then the result set can be generated as determined at step 904 by providing the content in the matching contexts, and also retrieving related advertisements according to context. At step 907, personalized data and tags related to the matched context can be loaded from personalized context database. At step 908, user can change the view to bring different contexts into focus and open a new window or frame to show more results in that context. The advertisement view may be updated accordingly and the context in focus in content frame can be expanded. The system enables a user to narrow down the result by choosing a context to see relevant sub-contexts or expand the search to go to higher-level contexts.

Certain embodiments of the invention enable users to search, navigate and personalize relevant contexts, and thus, navigate a knowledge landscape. Certain embodiments provide comprehensive methods and systems for creating, managing, searching, personalizing, and monetizing a knowledge system defined over a corpus of digital content. In particular, certain embodiments comprise interacting components including: (i) a system and method by which a user can initiate an in-depth search of a subject from a browser, a document viewer (such as IE Explorer), an electronic content creation tools (such as Microsoft Word and PowerPoint, Adobe PDF), communication tools (such as Yahoo mail and Messenger, MSN Messenger, Skype), or other information retrieval, viewing, or management software and tools; (ii) a method and a system by which a user can browse, navigate, pinpoint, and select relevant contexts, concepts, and documents to gain knowledge; a user can personalize knowledge through tagged, personalized context, and share this personalized context with his/her social/professional network securely and confidentially with the desired access control specified in the owner profile and context sharing profile; (iii) a system and method by which products and services can be advertised in specific contexts—in certain embodiments a site promoter can define a bidding or impression purchase list of context and concepts for search listings on Ad Billboards maintained on a search engine, thereby enabling more accurate, better targeted and higher revisited customer content using context-sensitive advertisement, knowledge search, personalized Tag, and Ad Billboard-Context-Synchronization presentation; and (iv) a method and a system by which a user can reach context-relevant and concept-relevant products and services through navigation of specific context or concepts of interests and switching to a different Ad Billboard by pinpointing a different context.

Figure 10:
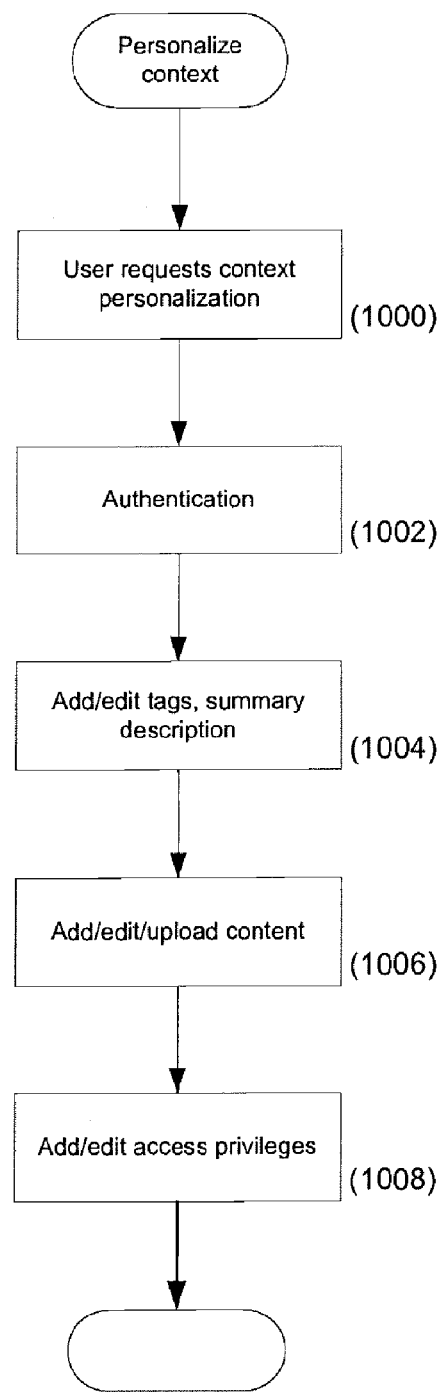

FIG. 10 illustrates a personalization process. In the illustrated example, user chooses to personalize the context of interest while navigating at step 1000. Initially, user is authenticated at step 1002. User can then input additional personal information the context at step 1004. Personal information can be added as new documents, new concepts and other elements of the context and can be provided as updates or modifications of existing documents, predefined concepts or additions and changes to other elements of the context in the form of addition, replacement or initialization of the elements or components. Personal information may include tags, summary, description, contacts, discussions, messenger logs, email addresses and any other digital contents. In certain embodiments, the system enables user to rate the context from different respects including relevancy, freshness, quality, etc. The context can be updated if it has previously been personalized. At step 1006, personal content can also be uploaded to a personalized account. At step 1008, the user can set access privileges and update the sharing profile. A sharing profile may include information governing access to personalized context (index) and a separate access list for the personalized contents of the context. Various security and access control mechanisms, processes and tools may be used including, for example, setting access control for personal access, group access and general access.

Figure 11:
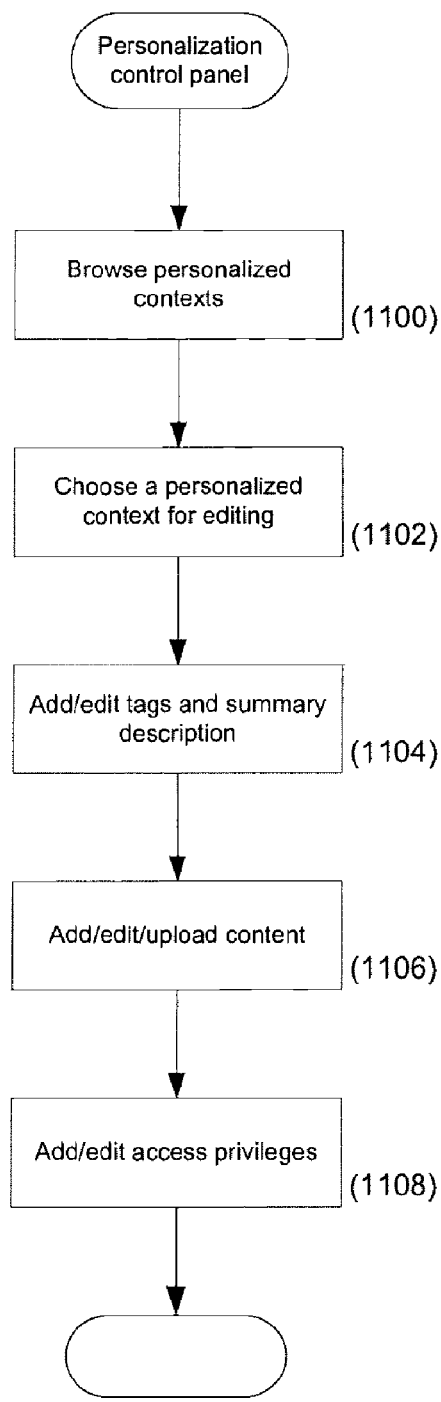

FIG. 11 illustrates a personalization control panel. Typically, a user can view, explore and search the list of contexts personalized and may manage the contents and tags and description. The system may also enable user to browse the personalized context hierarchy (step 1100), can choose to view or edit a context (step 1102) and edit, update or remove tags or summary description of the context (step 1104). User can also add additional personalized content or remove personalized content including word documents, text documents, PDF files, image files, video and multimedia, contacts and any other digital content format. User can also set or edit the access privileges of the context or personal contents.

In certain embodiments, a context may be updated by adding content, including documents. Typically, the new content is parsed for concepts and any new concepts in the content can be added to the context. In certain embodiments, a new context may be created that includes at least a portion of the original context as well as the new content and selected new concepts. Relevancy scores may be recalculated for updated or new contexts. Original and new contexts may be provided with links between one another. Furthermore, link information may be propagated as desired to previously linked contexts and can be added to other contexts that, for example, include at least one of the new concepts or at least a portion of the new content. This process of updating contexts, concepts, content and links may be executed responsive to automatic and manual updates.

In certain embodiments, the personalization engine can be hosted by a service provider. However, the personalization engine may also be hosted by one or more subscribers to a service, in which case the personalization engine can be integrated with internal security schemes of the one or more subscribers. Subscription may be provided for fee or by other arrangement.

Certain embodiments of the invention provide a method of defining multi-level knowledge security, interfacing, and management for both documents as information and for knowledge as a collection of information. This new knowledge management paradigm enables users to personalize and share this knowledge through their online social network and has many applications. For example, in research collaboration, where documents and papers comprise literature and books that are publicly available, knowledge being developed for new research, new papers, and other innovation can be maintained in confidentiality prior to publication of research results and patents. Certain embodiments can limit sharing of such information and knowledge to collaborators and can define knowledge as a collection of relevant papers and technical reports. Knowledge sharing and collaboration among members of a research group can include a collection of information such as knowledge context, owner profile, context sharing profile and an apparatus for collaborate and add their comments, tags and internal documents. In another example, data mining and security analysis for homeland security could be implemented that provides and maintains important knowledge regarding a group of related people or events, hidden links forming knowledge context to be searched and extracted. Furthermore, tracking, sharing, and collaboration related to this type of knowledge can be provided. In all of these examples, keyword sharing or single document sharing would be an inadequate method of sharing knowledge among a group of users.

Figure 12:
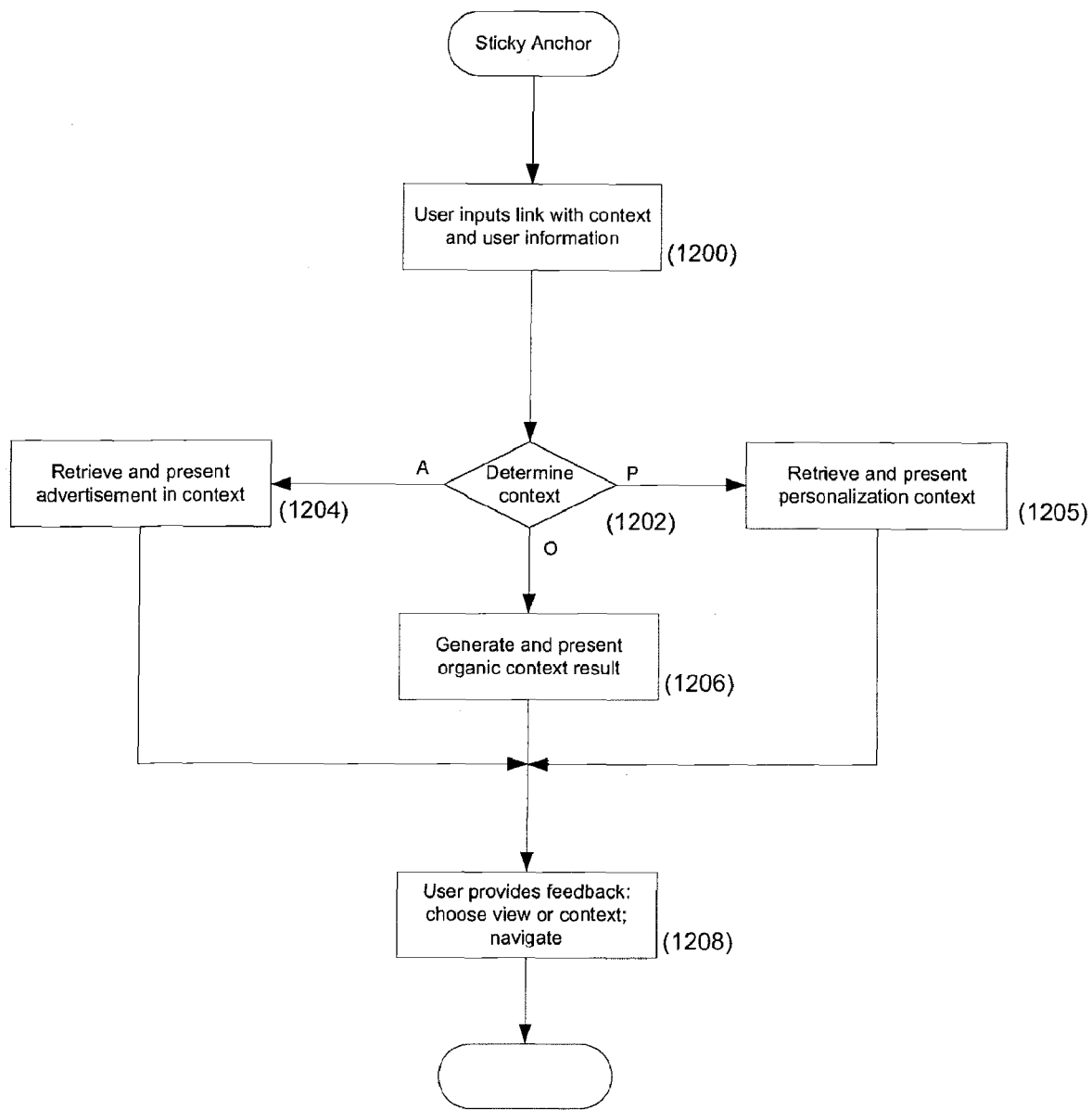

In certain embodiments, systems can be configured to generate and restore context anchors such that users may save and share personalized contexts. FIG. 12 illustrates an example in which such functionality is provided. In the example, context is extracted from a context anchor. Context anchor may be generalized as a hyperlink anchor and may include a link to system, context unique ID and user ID and an anchor text. Upon clicking on anchor context at step 1200, the user may be redirected to the corresponding context at step 1202. Relevant content associated with the corresponding context of the anchor can be retrieved at step 1206. Relevant advertisement associated with the context of the anchor may also be retrieved from advertisement context database at step 1204. With adequate access permissions and authentication the user may also view at step 1207 the personalized content provided by the personalization of the context corresponding to a username included in the anchor context. Access permissions and privileges can be assigned such that users and groups of users can be assigned rights to use, modify, add and delete one or more contexts. Access to certain contexts may be unrestricted.

In certain embodiments, the system enables a user to change the scope and view of the knowledge by expanding a context to see sub-contexts, thereby narrowing the search. The search can be expanded by reverting to parent contexts at step 1208. Personalized content and advertisement content in a context can be updated and synchronized with content contexts.

Figure 13:
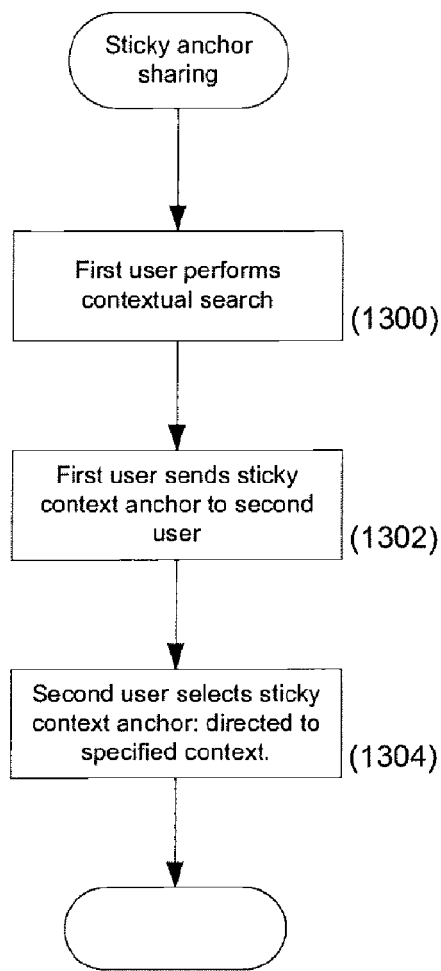

Turning now to FIG. 13, in certain embodiments, anchors to the context can be generated while a contextual search is performed at step 1300, whereby User A decides to generate a context anchor. User A can typically send or share the context anchor to any other user in the system through any communication scheme. The communication or sharing can be accomplished using any scheme or method including electronic mail, messenger, online group, forum, text messaging and other online communication scheme or online social network. At step 1304, User B may be taken to the system website and can be provided with the relevant contexts by clicking on the context anchor.

Figure 14:
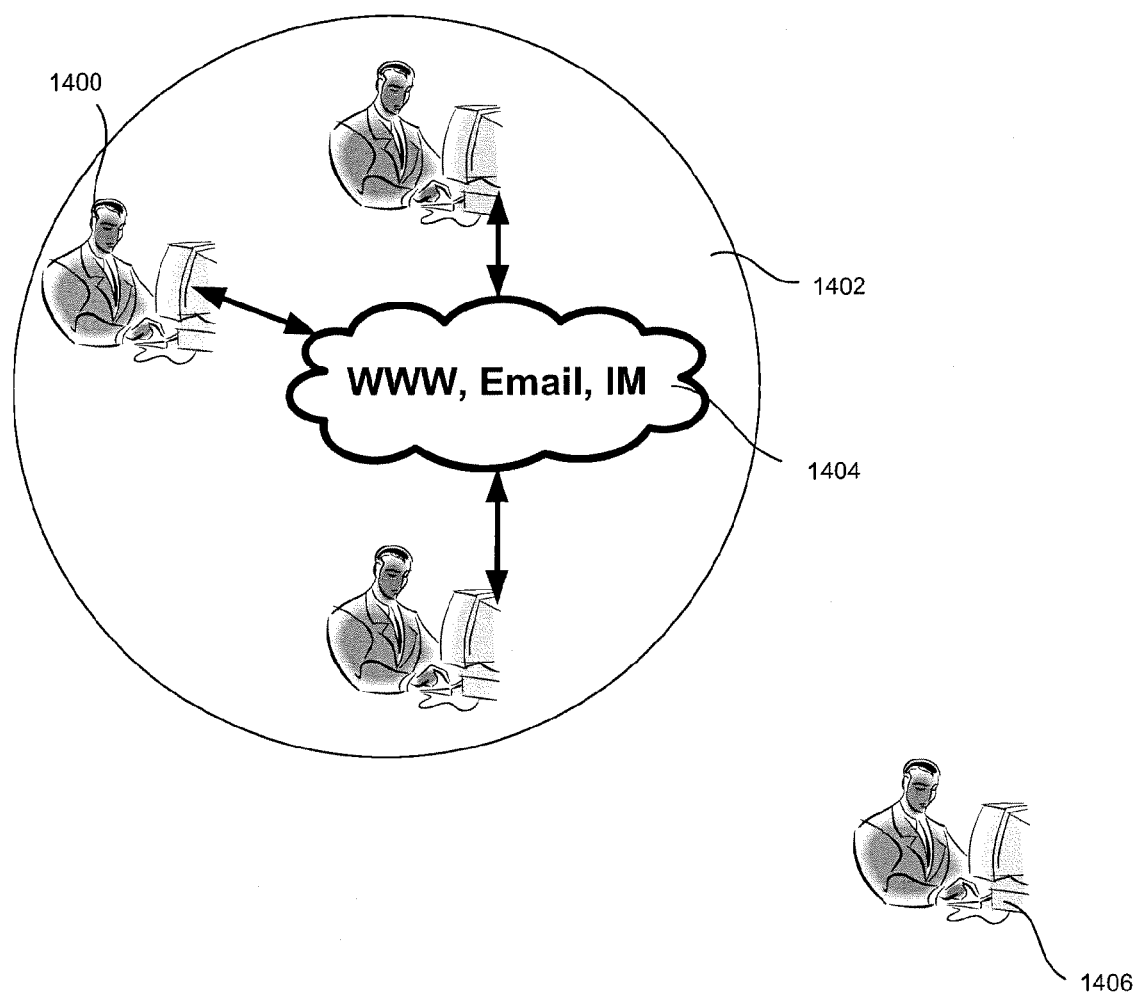

FIG. 14 illustrates a context anchor sharing architecture. User A 1400 can share personalized context with social networks or a special group 1402 with which User A 1400 is associated. Sharing can be achieved through any online communication method, scheme or network 1404. User C 1406, who is not in the social community of User A 1400, can not access the personalized parts of the context associated with User A 1400.

Figure 15:
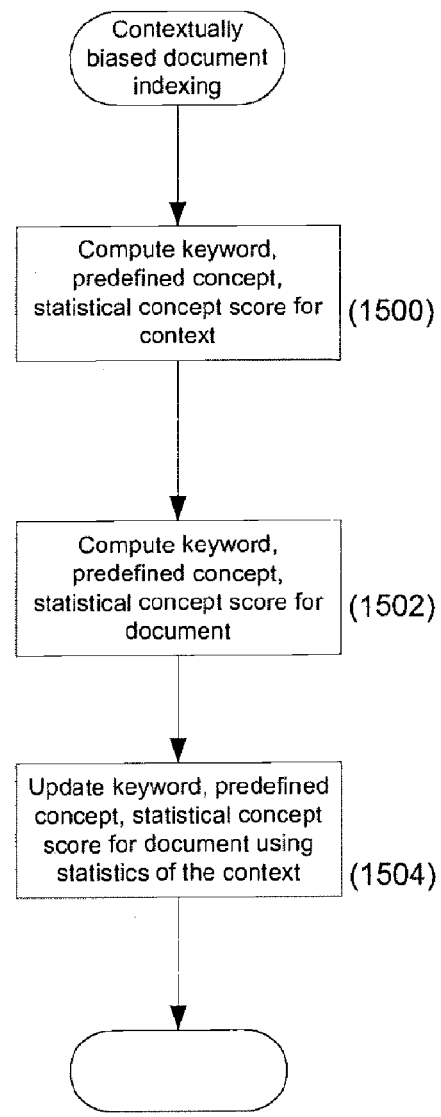

In certain embodiments of the current invention, access to contents may be biased by the index of the context. In-context indexing of the content is illustrated in more detail in FIG. 15. In certain embodiments, first keywords, predefined and statistical concepts and their relative score for the context are calculated at step 1500. The keyword, predefined concepts and statistical concepts of the content and their relevance score for the content can be calculated at step 1502. Inverted index of the content may then be biased by the inverted index of the context at step 1504 using any suitable method.

In certain embodiments, a summary of the context index can be appended to each document. The summarization can be achieved using different methods including methods that provide a random sampling of the text of the content in a context to calculate context index summary.

Figure 16:
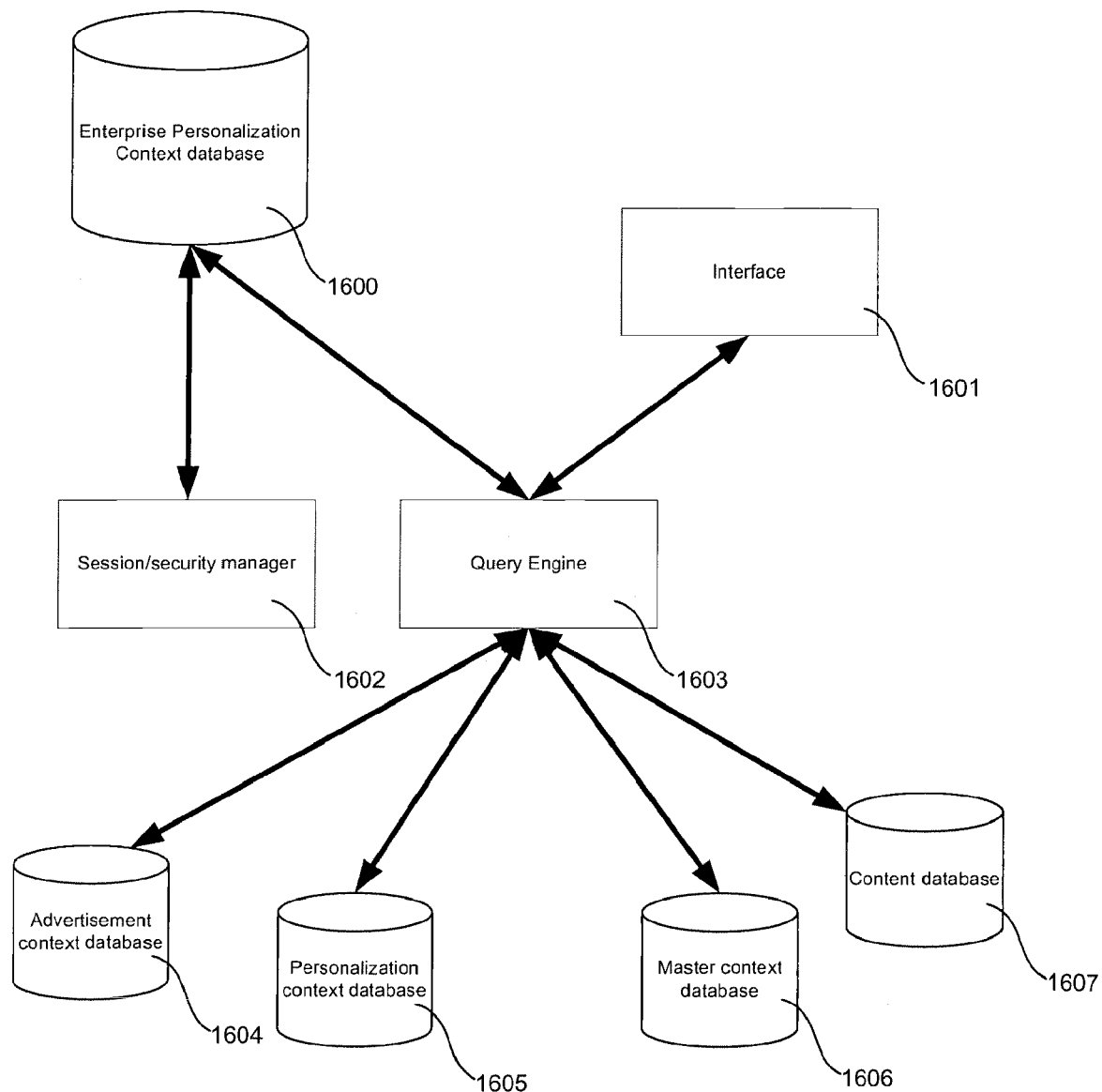

FIG. 16 illustrates an example of a generalized architecture that can be used for query matching. In the example, the architecture comprises an interface 1601 through which a user input or software query is obtained and sent to query engine 1603. Query engine 1603 may then fan out queries to master context database 1606, personalization context database, advertisement context database 1604, and enterprise personalization context database 1600. Access control can be implemented using a security or access control system 1602 that may be provided by the system or by the enterprise entity.

Certain embodiments provide a system that comprises computer implemented methods for adding and viewing references associated with one or multiples of context during electronic content creation (such as Microsoft Word and PowerPoint, Adobe PDF), browsing (such as IE Explore), and communication (such as Yahoo Mail and Messenger, MSN Messenger, Skype). The methods may enable a user to insert one or multiple of context IDs or Tag IDs next to the selected text pattern. A recommendation of relevant multiple context or relevant concepts of each relevant context can be provided through context analysis of the selected text pattern and user profile. Certain embodiments include a plurality of interfaces to recommend relevant multiple context or relevant concepts for a set of user input keywords. Certain embodiments operate by, for example, responding to a right click on a pattern or highlighted text, opening a new window or a keyboard shortcut. The method can also enable users to view associated context or multiples of contexts in a separate display window for displaying ranked relevant documents in this context.

FIG. 17 illustrates an example of a context based interface which enables user to navigate different contexts and provide relevant advertisement in the context. The operation of certain embodiments can be better understood by considering this example. User typically provides an input 84 and, responsive to a pressing of a search button 85, the system can match relevant contexts and provide top contexts related to the user query. For each context, top concepts including predefined and statistical concepts 86 are typically provided, and top contents relevant to user query in context are typically provided with snippets of the relevant information 88. Also relevant advertisement in context or pulled and displayed on the right hand side 87 may be ranked by the engine, wherein ranking may include consideration of different parameters and their relevance to this context, click-through history, and bid amount.

User can typically retrieve more result for this context by pressing "more in this context" button 90 such that more results from this context are displayed in this page and less results from other contexts. Additionally, the user can choose to expand this context by pressing an "expand this context" button 89. The interface can also include a similar button that expands the results to parent contexts. Advertisement section 87 may be updated as desired to reflect advertisements in context in focus. It will be appreciated that the same functionalities also hold for other contexts 98, 92, 91, 95, 94.

FIG. 18 illustrates another example of context navigation interface, where the user input has been "Sun", three different contexts have been matched and showed to user 98,99,100, which as described above include predefined and statistical concepts, relevant contents in context and advertisement in context.

Aspects of the Invention as Described Above Include:

A computer implemented method is provided for categorizing, indexing, matching, presenting, navigating, and managing digital content into different contexts of relevant content, the digital content including documents or any other suitable content. In certain embodiments, this method of categorizing comprises forming a context having a set of relevant documents where a context is uniquely described by a universal ID, a set of constituent documents where each document may have an assigned score, a set of concepts where each concept can be represented by one or more patterns of words and assigned scores, links to other contexts, and an annotation. In certain embodiments, this method of categorizing comprises forming a set of contexts that comprise overlapping sets of relevant contents. In certain embodiments, document content may have membership in only one, or in a set of different contexts. Further, in certain embodiments, documents belonging to overlapping contexts have a subset of concepts associated with each overlapping context. In certain embodiments, this method of categorizing comprises indexing contents with respect to different contexts, concepts, personalization profiles, security profile, and identifying and indexing patterns of words for each concept in each context; updating the description and or properties of each relevant context or creating new sets of contexts upon the addition of a new document; matching one or more contexts to a software input query and any user input query wherein at least some queries are reverse mapped to a set of contexts that are relevant to the given query; presenting content based on content ranking in a set of relevant context scores, and generating a list of ranked documents for each relevant context, sorted according to the likelihood of relevance to user interests; and allowing a user to browse relevant content in each context, navigate through different contexts, mark and or personalize interesting content or context, and further narrow down or expand the search context. Aspects of the invention further include ranking context relevancy with respect to scores of constituent concepts and computation of context cores for the union and intersections of overlapping multiples of contexts. In certain embodiments, the context pinpointed by the user may be expanded into a larger area or a separate display window for displaying ranked relevant documents in this context. In certain embodiments, these methods of categorizing further provide indexing of contents in context that comprises: generating a list of predefined concepts or objects based on combinations of categorized and structured data, where predefined concepts may include a unique predefined concept ID, pattern of single or multiple words; analyzing contexts and linking contexts to relevant predefined concepts with a score associated with it; analyzing contexts and finding new statistical concepts where each concept may include unique statistical concept ID and a score associated with it in context; calculating inverted index from keywords, predefined concepts and statistical concepts to contexts where sub-contexts may inherit related concepts and keyword score of their parent context; and calculating inverted index from patterns like keywords, predefined concepts and statistical concepts to content, where score of the patterns in document is influenced by score of the pattern in the contexts that the document belongs to.

Certain embodiments provide a computer implemented method for operating context-sensitive advertisement databases to support advertisement subscription, selection, presentation of context-sensitive Ad Billboards operated in conjunction with search engines for PPC or impression-based advertisement wherein search results are presented in one or more contexts, where each context is associated with a context-sensitive Ad Billboard and each advertisement subscribes to one or multiples of context and the relevant concepts. In certain embodiments, the method comprises: forming a context-sensitive advertisement with an advertisement unique id, and billing information and a set of context id and concepts, the title, the description, URL of the site, and the PPC pricing metrics or impression pricing metrics for each concept, for each context or a selected context; recommending relevant multiple contexts or relevant concepts of each relevant context via context analysis of the web site described in a context-sensitive advertisement; recommending relevant multiple context or relevant concepts for a set of user input keywords or description text and presenting an associated Ad Billboard of the context when a user pinpoints a context. In certain embodiments, a user selects an Ad Billboard, wherein the Ad Billboard will be displayed at the top and the associated context becomes a pinpointed context. In certain embodiments, the context pinpointed by the user is expandable into one or more larger areas, the one or more larger areas including a separate display window for displaying ranked relevant documents in context with associated advertisements in context.

A computer implemented method for knowledge personalization, sharing, and management for supporting social/professional networks, comprising: defining, personalizing, sharing, and managing a unique anchor associated with a context, union or intersection of a set of contexts, wherein the system enables a user to personalize the contexts by adding tags or any other additional data. In certain embodiments, a tag is identified by a unique Tag ID, owner profile, sharing profile, one or multiples of contexts, description, and summary, contacts, array of hyperlinks, URL anchors, context anchors, messenger discussions and any other relevant information; providing access to personalized contexts through social networks as consistent with the owner profile and context sharing profile for sharing and cross searching; and allowing users to add personal content to search engine contexts with different permissions to share it with their social networks community.

A computer implemented method for adding and viewing references associated with one or a set of contexts during electronic content creation including Microsoft Word and PowerPoint, Adobe PDF, for browsing including as Internet Explorer, and communication such as Yahoo Mail and Messenger, MSN Messenger, Skype, where the method comprises: allowing a user to insert one or a set of context IDs or Tag IDs next to the selected text pattern; providing recommendations of relevant multiple contexts or relevant concepts of each relevant context via context analysis of the selected text pattern and user profile; recommending relevant multiple contexts or relevant concepts for a set of user input keywords; and presenting an associated context or multiples of contexts in a separate display window for displaying ranked relevant documents in this context.

Certain embodiments of the invention provide a method of maintaining context comprising the steps of forming a context, the context including content, and one or more predefined concepts, wherein each of the predefined concepts is characterized by a pattern of terms. In some of these embodiments, the terms include terms comprising multiple words. In some of these embodiments, the context further includes relevancy scores. Some of these embodiments, further comprise the step of providing a relevancy score for each of the one or more concepts by calculating relevance of the each concept to the context. In some of these embodiments, the content comprises a plurality of documents, and some embodiments further comprise the step of providing a relevancy score for each of the plurality of documents by calculating relevance of the each document to the context. In some of these embodiments, the content comprises a plurality of documents, and further comprising the step of providing relevancy scores for each of the plurality of documents by calculating relevance of the each document to each of the one or more concepts. Some of these embodiments further comprise the step of defining the predefined concepts based on terms extracted from the content. In some of these embodiments, the content comprises a plurality of documents, and the step of defining includes calculating statistical concepts based on statistical frequency of occurrence of terms within the plurality of documents. In some of these embodiments, the content comprises a plurality of documents, and the step of defining includes calculating statistical concepts based on statistical frequency of occurrence of words within one or more of the plurality of documents. Some of these embodiments further comprise the step of adding new content to the context. Some of these embodiments further comprise the step of defining a new predefined concept in the context, wherein the new predefined concept is calculated based on terms derived from the new content. In some of these embodiments, the new predefined concept is defined based on statistical frequency of occurrence of terms within the new content. In some of these embodiments, the new predefined concept is defined based on statistical frequency of occurrence of words within the content of the context, including the added new content. In some of these embodiments, the content comprises a plurality of documents, and some embodiments further comprise the steps of adding a new document to the context and providing a relevancy score for the new document by calculating relevance of the new document to the context. Some of these embodiments further comprise the step of providing additional relevancy scores for the new document by calculating relevance of the new document to each of the one or more concepts. In some of these embodiments, the content comprises a plurality of documents, and some embodiments further comprise the steps of providing a new document, defining a new concept based on terms extracted from the new document, and updating the context, including the steps of adding the new concept to the one or more concepts to obtain updated concepts, and adding the new document to the plurality of documents to obtain an updated plurality of documents. In some of these embodiments, the step of defining includes calculating statistical concepts based on statistical frequency of occurrence of terms within the new document. In some of these embodiments, the step of defining includes calculating statistical concepts based on statistical frequency of occurrence of words within the new document. In some of these embodiments, the context also includes relevancy scores and further comprising the step of recalculating the relevancy scores based on the new concept. In some of these embodiments, the step of recalculating includes providing relevancy scores for the new document by calculating relevance of the new document to the updated context. In some of these embodiments, the step of recalculating includes providing relevancy scores for the updated plurality of documents by calculating relevance of the updated plurality of documents to the updated context. In some of these embodiments, the step of recalculating includes providing relevancy scores for the updated concepts by calculating relevance of the updated concepts to the updated context. In some of these embodiments, the step of recalculating includes providing relevancy scores for the updated plurality of documents by calculating relevance of the updated plurality of documents to each of the one or more updated concepts. Some of these embodiments further comprise the step of creating a new context, the new context including the one or more concepts, the content, a new document, and a new concept, the new concept being based on terms extracted from the new document. In some of these embodiments, the new context further comprises a link to the previously formed context and some embodiments further comprise the step of adding a link to the new context to the previously formed context. In some of these embodiments, the pattern of terms include terms comprising single and multiple words previously extracted from categorized data. Some of these embodiments further comprise the step of matching a query to the context based on concepts extracted from the query.

Certain embodiments of the invention provide a search method comprising maintaining a plurality of contexts, each context including content comprising a plurality of documents, and one or more predefined concepts, extracting search terms from the query, and matching the search terms to at least one of the plurality of contexts, wherein each of the predefined concepts is characterized by a pattern of terms. In some of these embodiments, the step of matching includes calculating relevance of the search terms to selected ones of the plurality of contexts. In some of these embodiments, the step of matching includes calculating relevance of the search terms to a selected one of the plurality of contexts, and matching the selected one based on the calculated relevance. In some of these embodiments, relevance is calculated as a frequency of occurrence of terms within the plurality of documents of the selected one. In some of these embodiments, the plurality of contexts comprises a first context including links to a second context. In some of these embodiments, the second context includes at least one concept included in the first context. In some of these embodiments, the second context includes at least one document included in the first context. In some of these embodiments, the second context includes fewer concepts than the first context. In some of these embodiments, the second context identifies more responses to the query than identified by the first context. In some of these embodiments, the first context identifies fewer responses to the query than identified by the second context.

Certain embodiments of the invention provide a method for sharing context comprising maintaining a plurality of contexts, each context including content, and one or more predefined concepts, and providing access to selected contexts to a plurality of users, wherein the content comprises documents and objects, and wherein each of the predefined concepts is characterized by a pattern of terms. In some of these embodiments, at least one of the plurality of contexts is updated based on input received from the plurality of users. In some of these embodiments, a portion of one of the plurality of contexts is generated based on input of a user. Some of these embodiments further comprise the step of personalizing a portion of a selected context, wherein personalizing includes modifying at least one element of the selected context, the elements including one or more tags, summaries, descriptions, contacts, discussions, messenger logs and email addresses. In some of these embodiments, the at least one of the plurality of contexts is maintained private for a first user. In some of these embodiments, access to at least one of the plurality of contexts is provided to less than all of the plurality of users. In some of these embodiments, access to at least one context is provided to each of the plurality of users. In some of these embodiments, access to at least one context is unrestricted. In some of these embodiments, access includes view privileges. In some of these embodiments, access includes modify privileges. In some of these embodiments, access includes delete privileges. In some of these embodiments, access is protected by a security system. Some of these embodiments further comprise the step of encrypting at least one context.

Certain embodiments of the invention include a method for providing relevant advertising comprising maintaining a plurality of contexts, each context including content relevant to the each context, and one or more predefined concepts, and mapping advertising content to selected ones of the plurality of contexts, wherein each of the predefined concepts is characterized by a pattern of terms, and the advertising content is provided to a user in response to a query. In some of these embodiments, the step of mapping includes obtaining one or more advertisements from an external advertisement feed. In some of these embodiments, the step of mapping includes obtaining one or more advertisements from a manual entry based on user selection of one or more contexts. In some of these embodiments, the step of mapping further includes providing an advertisement based on bids received from one or more sources. In some of these embodiments, the step of mapping includes obtaining one or more advertisements based on context of a query.

Certain embodiments of the invention include a method for providing categorized data comprising maintaining a plurality of contexts, each context including content relevant to the each context, and one or more predefined concepts, and mapping categorized data to selected ones of the plurality of contexts, wherein each of the predefined concepts is characterized by a pattern of terms, and the categorized data is provided to a user in response to a query. In some of these embodiments, the categorized data is obtained from one or more external feeds. In some of these embodiments, the categorized data is obtained from a manual entry based on user selection of one or more contexts. In some of these embodiments, the categorized data is mapped based on context of a query.

Certain embodiments of the invention provide a computer implemented method for operating context-sensitive databases comprising maintaining a plurality of contexts, each context including content relevant to the each context, and one or more predefined concepts, associating an advertisement with certain of the plurality of contexts, and presenting the advertisement in response to user selection of one of the certain contexts. In some of these embodiments, each of the predefined concepts is characterized by a pattern of terms. In some of these embodiments, the advertisement is associated based on relevancy of the certain contexts to one or more concepts. In some of these embodiments, the step of presenting includes matching a document retrieved by the user with one of the certain contexts, and providing the advertisement in a context-sensitive Ad Billboard. In some of these embodiments, matching includes determining relevance of terms in the document to at least one of the predefined concepts. In some of these embodiments, associating includes subscribing to a service implementing the method.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the figures. It is intended that the scope of the invention include such changes and modifications. Accordingly, the specification and drawings are to be regarded in an illustrative rather than a restrictive sense.

What is claimed is:

1. A computer implemented method for providing relevant advertising, the method comprising:
   receiving a query from a user;
   determining a context of the query using a representation of a structured web community stored in a database, the structured web community comprising a plurality of contexts, each context comprising a set of content, the set of content in each context determined using a community finding method based on structural closeness and semantic closeness of the content, each context including an array of predefined concepts generated based on terms extracted from the set content in the context and statistical frequency of occurrence of terms within the set of content in the context, each predefined concept characterized by a pattern of terms derived from the set of content in the context, wherein a plurality of the plurality of contexts are associated together to form a hierarchy of overlapping contexts;

identifying at least one predefined concept associated with the determined context;

mapping advertising content to the at least one context of the plurality of contexts based on the at least one predefined concept; and providing the advertising content to the user in response to the query;

wherein determining the set of content in each context using a community finding method based on structural closeness and semantic closeness of the content comprises:

selecting a node in a network as a source node; computing a set of local communities for the source node;

identifying a set of nodes in the set of local communities having a weight greater than a threshold;

generating a strong local community for the source node including only the set of nodes that have a weight greater than the threshold;

storing the strong local community as one of a plurality of communities of the network;

removing the set of nodes in the strong local community and edges connected to the set of nodes from the network to generate a reduced network;

selecting a node in the reduced network as a second source node;

generating a second strong local community for the second source node, the second strong local community comprising a second set of nodes;

storing the second strong local community as one of the plurality of communities of the network;

removing the second set of nodes in the second strong local community from the network to generate a second reduced network;

repeating the selecting, generating, storing and removing until a reduced network is generated that comprises only nodes with a degree less than a threshold value; and labeling the set of stored strong local communities as one of a disjoint community structure of the network or an overlapping community structure of the network.

2. The method of claim 1, wherein the mapping comprises obtaining one or more advertisements from an external advertisement feed.

3. The method of claim 1, wherein the mapping comprises obtaining one or more advertisements from a manual entry based on user selection of one or more contexts.

4. The method of claim 1, wherein the mapping further comprises providing an advertisement based on bids received from one or more sources.

5. The method of claim 3, wherein the mapping comprises obtaining one or more advertisements based on context of a query.

6. A computer implemented method for providing categorized data, the method comprising:

maintaining a representation of a structured web community stored in a database, the structured web community comprising a plurality of contexts, each context comprising a set of content, the set of content in each context determined using a community finding method based on structural closeness and semantic closeness of the content in the context, each context including an array of predefined concepts generated based on terms extracted from the set content in the context and statistical frequency of occurrence of terms within the set of content in the context, each predefined concept characterized by a pattern of terms derived from the set of content in the context, wherein a plurality of the plurality of contexts are associated together to form a hierarchy of overlapping contexts;

mapping advertising content to at least one of the plurality of contexts using the at least one predefined concept; and storing the mapping of the advertising content to the at least one context in a database;

wherein determining the set of content in each context using a community finding method based on structural closeness and semantic closeness of the content comprises:

selecting a node in a network as a source node; computing a set of local communities for the source node;

identifying a set of nodes in the set of local communities having a weight greater than a threshold;

generating a strong local community for the source node including only the set of nodes that have a weight greater than the threshold;

storing the strong local community as one of a plurality of communities of the network;

removing the set of nodes in the strong local community and edges connected to the set of nodes from the network to generate a reduced network;

selecting a node in the reduced network as a second source node;

generating a second strong local community for the second source node, the second strong local community comprising a second set of nodes;

storing the second strong local community as one of the plurality of communities of the network;

removing the second set of nodes in the second strong local community from the network to generate a second reduced network;

repeating the selecting, generating, storing and removing until a reduced network is generated that comprises only nodes with a degree less than a threshold value; and labeling the set of stored strong local communities as one of a disjoint community structure of the network or an overlapping community structure of the network.

7. The method of claim 6, wherein the advertising content is obtained from one or more external feeds.

8. The method of claim 6, wherein the advertising content is obtained from a manual entry based on user selection of one or more contexts.

9. The method of claim 8, wherein the advertising content is mapped based on context of a query.

10. A computer implemented method for operating context-sensitive databases, the method comprising:

receiving a user selection of one of a plurality of contexts;

determining one or more predefined concepts associated with the one of the plurality of contexts from a representation of a structured web community stored in a database, the structured web community comprising a plurality of contexts, each context comprising a set of content, the set of content included in each context determined using a community finding method based on structural closeness and semantic closeness of the content in the context, each context including an array of predefined concepts generated based on terms extracted from the set content in the context and statistical frequency of occurrence of terms within the set of content in the context, each predefined concept characterized by a pattern of terms derived from the set of content in the context, wherein a plurality of the plurality of contexts are associated together to form a hierarchy of overlapping contexts;

associating an advertisement with the one of the plurality of contexts based on the at least one predefined concept; and presenting the advertisement in response to the user selection of the one of the plurality of contexts;

wherein determining the set of content in each context using a community finding method based on structural closeness and semantic closeness of the content comprises:

selecting a node in a network as a source node; computing a set of local communities for the source node;

identifying a set of nodes in the set of local communities having a weight greater than a threshold;

generating a strong local community for the source node including only the set of nodes that have a weight greater than the threshold;

storing the strong local community as one of a plurality of communities of the network;

removing the set of nodes in the strong local community and edges connected to the set of nodes from the network to generate a reduced network;

selecting a node in the reduced network as a second source node;

generating a second strong local community for the second source node, the second strong local community comprising a second set of nodes;

storing the second strong local community as one of the plurality of communities of the network;

removing the second set of nodes in the second strong local community from the network to generate a second reduced network;

repeating the selecting, generating, storing and removing until a reduced network is generated that comprises only nodes with a degree less than a threshold value; and labeling the set of stored strong local communities as one of a disjoint community structure of the network or an overlapping community structure of the network.

11. The method of claim 10, wherein the advertisement is associated based on relevancy of the one of the plurality of contexts to one or more concepts.

12. The method of claim 10, wherein the presenting comprises:

matching a document retrieved by the user with one of the certain contexts; and providing the advertisement in a context-sensitive Ad Billboard.

13. The method of claim 12, wherein matching comprises determining relevance of terms in the document to at least one of the predefined concepts.

14. The method of claim 10, wherein the associating comprises subscribing to a service implementing the method.

15. The method of claim 1, wherein the set of content in each context is determined using an information neighborhood analysis.

16. The method of claim 1, wherein the set of content in each context is determined using a percolation community finding method combined with an agglomerative community fining method.

17. The method of claim 1, wherein the set of content in each context is determined using a percolation community finding method combined with a second community fining method.

18. The method of claim 1, wherein each context is further associated with a statistical concept, wherein the statistical concept is determined based on a statistical frequency of occurrence of terms within the context.

19. The method of claim 1, wherein mapping the advertising content to a context comprises:

receiving user input, wherein the user input comprises a description, a website or an identification of at least one context;

determining relevant contexts based on the user input; and associating the advertisement with the relevant contexts.

20. The method of claim 1, wherein determining the set of content in each context using a community finding method based on structural closeness and semantic closeness of the content comprises:

assigning a set of nodes as source nodes;

initiating a plurality of percolation messages from each of source nodes at a plurality of percolation probabilities, wherein the plurality of percolation probabilities are selected from a set of values between 0 and 1;

determining a list of nodes that received the plurality of percolation messages for each of the plurality of source nodes;

aggregating the list of nodes for each of the plurality of source nodes to determine a local neighborhood for each of the plurality of source nodes, wherein each node is weighted based on a number of times each node received the plurality of percolation messages;

plotting the local neighborhood size versus percolation probabilities for each of the local neighborhoods;

locating phase transition points in the plot; and determining nested local communities for the plurality of source nodes by combining the local neighborhoods at the phase transition points.

* * * * *